United States Patent [19]

Ito et al.

[11] 4,059,376

[45] Nov. 22, 1977

[54] APPARATUS FOR MOULDING HYDRAULIC CEMENT OR THE LIKE MATERIAL

[75] Inventors: Yasuro Ito; Hideharu Kaga, both of Tokyo; Yasuhiro Yamamoto, Ageo; Tadayuki Sumita, Tokyo, all of Japan

[73] Assignees: Yasuro Ito; Taisei Corporation, both of Tokyo, Japan

[21] Appl. No.: 772,421

[22] Filed: Feb. 28, 1977

Related U.S. Application Data

[62] Division of Ser. No. 526,825, Nov. 25, 1974, Pat. No. 4,036,922.

[30] Foreign Application Priority Data

| | | |
|---|---|---|
| Nov. 24, 1973 | Japan | 48-131189 |
| Mar. 14, 1974 | Japan | 49-28598 |
| Mar. 20, 1974 | Japan | 49-30888 |
| July 23, 1974 | Japan | 49-83787 |
| July 25, 1974 | Japan | 49-84673 |
| Oct. 9, 1974 | Japan | 49-115596 |

[51] Int. Cl.[2] .......... B28B 13/02; B29F 1/00

[52] U.S. Cl. .......... 425/546; 425/217; 425/405 A; 425/812; 425/DIG. 60; 249/141; 425/559

[58] Field of Search .......... 425/217, 242 R, 244, 425/405 R, 812, DIG. 60; 249/141

[56] References Cited

U.S. PATENT DOCUMENTS

| | | | |
|---|---|---|---|
| 2,524,419 | 10/1950 | Billner | 425/405 R X |
| 2,528,643 | 11/1950 | Dubbs | 425/405 R X |
| 2,730,783 | 1/1956 | Kennison | 425/405 R X |
| 3,234,598 | 2/1966 | Quinn | 425/405 R X |
| 3,267,517 | 8/1966 | Altermatt | 425/242 R X |
| 3,357,057 | 12/1967 | Bricy | 425/242 R X |
| 3,561,061 | 2/1971 | Bricy | 425/242 R |
| 3,663,148 | 5/1972 | Walker et al. | 425/405 R |
| 3,832,107 | 8/1974 | Cox et al. | 425/405 R X |

*Primary Examiner*—J. Howard Flint, Jr.

*Attorney, Agent, or Firm*—Birch, Stewart, Kolasch and Birch

[57] ABSTRACT

Hydraulic cement or the like is poured into a closed mould under a reduced pressure condition to a level slightly higher than a predetermined level. Coarse aggregate and steel rods are prepacked in the mould. After pouring, the pressure in the mould is increased to atmospheric pressure or a higher pressure to force the hydraulic cement above the predetermined level back into the space below the level thus compacting the poured in hydraulic cement. A cushion device is provided for the pouring device. An overflow tank is connected to the mould to observe the level of the poured cement. The pressure in the overflow tank is also decreased during pouring and increased after pouring.

59 Claims, 46 Drawing Figures

APPARATUS FOR MOULDING HYDRAULIC CEMENT OR THE LIKE MATERIAL

This application is a divisional, of copending application Ser. No. 526,825, filed on Nov. 25, 1974, now U.S. Pat. No. 4,036,922.

BACKGROUND OF THE INVENTION

Many methods and apparatus for manufacturing various articles from hydraulic cement and similar materials have been proposed in the past and has been used in many fields. According to these prior art methods a mixture of the castable substance is cast into an open mould under atmospheric pressure and after the cast substance has been hardened it is taken out of the mould. To increase the density of the cast substance, oscillation, compressive force or centrifugal force is applied to the cast substance or the surface of the cast article is subjected to a reduced pressure. Even when any one or combinations of these treatments are used, it is not always possible to obtain products having desired density and mechanical strength. More particularly, in order to prepare a desired mixture it is necessary to thoroughly admix the raw materials and in order to satisfactory cast the mixture thus prepared it is necessary to add an excess quantity of water to the raw materials. Even when minute care is taken during the mixing operation, it is unavoidable to prevent air bubbles from becoming entrained in the mixture. Such excessive water or entrained air results in air voids in the body of the cast article or causes it to shrink. Where curing heat is applied, the excess water is vapourized, forming large voids in the cast article. Also the entrained air increases its volume when heated thus also forming large voids which often interconnect with each other to form cracks. Although many efforts have been made to remove such excess water or entrained air, it has been difficult to completely remove them so that it has been difficult to obtain dense, crack and void free products. For this reason, for finishing the surface of the cast products as described above it is necessary to let them stand for one or two hours for the purpose of stabilizing the composition of the cast mixture. During this interval, the excess water oozes from the cast product and collects on the surface thereof. Unless such oozed water is completely removed, surface finishing or post treatment should not be made. For this reason, the casting process of the mixture requires a considerable amount of labor and time to obtain finished products of desired characteristics which are not suitable for present day mass production which requires high speed production at low cost. The post treatment including vibration or centrifugal force produces noise, thus causing public hazards. Also the application of a pressure or a reduced pressure can only improve the quality of the surface portion of the cast product and can not improve the quality of the deep portion of the core of the article. Of course these post treatments require special equipment, skill and additional labor and cost.

SUMMARY OF THE INVENTION

Accordingly the general object of the present invention is to provide an improved apparatus for moulding hydraulic cement or the like which can obviate the difficulties of the prior art apparatus described above.

A further object of the present invention is to provide an improved apparatus for removing substantially all excess water and entrained air from the hydraulic cement before it is poured. According to the conventional method of moulding wherein the hydraulic cement is poured in the mould under atmospheric pressure, although pouring can be made very easily, it is difficult to remove the excess water and entrained air once the hydraulic cement has been poured into the mould. According to the present invention, this object can be accomplished by reducing the pressure in the mould. Thus, when the hydraulic cement is poured into the mould its excess water and entrained air are readily removed, thus assuring a void free cast product. When the pressure in the mould is restored to atmospheric pressure or a higher pressure, the structure of the cast product becomes more dense. Furthermore, since a closed mould is used, no surface finishing is necessary.

Another object of the present invention is to make easy the pouring of the hydraulic cement into the mould. Generally, it is not easy to pour the hydraulic cement or mixture into a closed mould and such method requires a long time. However, according to the present invention since the pressure in the mould is reduced below the atmospheric pressure it is possible to rapidly pour the mixture into the mould by utilizing the pressure difference on the inside and outside of the mould. Except in the case wherein coarse aggregate is prepacked in the mould, it is not necessary to use a pump or other means for feeding the mixture under pressure, thus greatly simplifying the apparatus. The operator is required only to operate valves while watching the level of the moulded mixture. In certain cases, head difference and an independent source of pressure are utilized for pouring. Under normal moulding operations it is necessary to only reduce the pressure in the mould to a value less than the atmospheric pressure, and the pressure difference on the inside and outside of the mould is sufficient to produce adequate pouring.

Still another object of the present invention is to provide an improved apparatus that can produce dense products having high mechanical strength. In the present invention a so-called prepacking process is used wherein coarse aggregate is packed (if necessary together with steel rods) in the mould before pouring. It is already known in the art that where the prepacking process is used, it is possible to adequately arrange the coarse aggregate in the mould and to improve the strength of the moulded products thereby eliminating the limit imposed on the specific gravity of the coarse aggregate. However, according to this process there is a tendency of forming a large number of air voids caused by the air contained in the closed mould. Moreover, the prepacked coarse aggregate exhibits a large resistance to the flow of the mixture being added. Even when an open mould is used such difficulties are unavoidable. The area in which one pouring port can efficiently pour the mixture or cement mortar is small, even when pressure is applied to the mixture during pouring by means of a pouring pump. As a result, it has been necessary to install a plurality of pouring ports at a spacing of one to two meters. For this reason, although the prepacking process has been used for more than 30 years it was not used to manufacture precast concrete products. The present invention fully utilizes the advantages of the prepacking process. Thus, since the pressure in the mould is reduced it is possible to remove substantially all of the air in the small interstices between the grains of the coarse aggregate thus enabling the mixture to impregnate the poured mortar even in the very small interstices without an appreciable resistance caused by the air sealed in the mould. Accordingly, the bonding strength between the mortar and the coarse aggregate is greatly improved thus increasing the mechanical strength of the product. As has been pointed out before, it is possible to smoothly and readily pour the mortar not containing the coarse aggregate without any severe limits on the coarse aggregate. In the prior art method, however, the coarse aggregate was required to have a substantially spherical shape and its grain size was required to lie in a predetermined range. According to the present invention, it is possible to use any one of many types of the coarse aggregates for efficiently utilizing thin desirable characteristics. Excessive water contained in the mortar is preferentially absorbed by the coarse aggregate thus improving the cast product and making it easier to pour. For this reason, the area that can be efficiently poured by one pouring port is increased several times compared to that of the conventional method.

A still further object of the present invention is to provide an improved apparatus for effectively removing excess water and entrained air before pouring which are contained in a mixture having a high content of water and hence a high degree of fluidity. Where the mortar is poured into a closed mould, it is necessary to use an excess quantity of water in the mortar for the purpose of permitting it to flow through a pouring pipe without clogging the same. According to the present invention an improved pouring tank is used including means for removing excess water and entrained air.

Still another object of the present invention is to provide an improved apparatus for moulding hydraulic cement or the like capable of uniformly pouring the mortar into a closed mould. Even when the mortar is poured under a reduced pressure condition, where the mortar is poured into a closed mould having a considerable width, after the mortar has impregnated into the areas of small resistance, the air remaining in the remaining portions manifests substantial resistance to the flow of the mortar.

Yet another object of the present invention is to provide an apparatus which makes it possible to carry out the invention in a limited floor area or structure. The size of cast concrete products is increasing by the year and thus it is necessary to manufacture in factories huge products having sides of several meters or more. Mass production of such huge plate shaped cast concrete products in a horizontal plane requires a large floor space. Accordingly, the present invention also provides an improved apparatus for moulding hydraulic cement in a vertical mould, thus making it possible to manufacture on a mass production scale in a relatively narrow floor space.

Another object of the present invention is to provide a relatively compact apparatus capable of smoothly pouring the mortar into a closed mould under a reduced pressure condition. To mould various products under a reduced pressure condition, it is necessary to use a specially constructed mould. However, due to the increased size of the products, in certain cases it is necessary to use a huge mould having one side exceeding several meters. Moreover, as it is necessary to construct the mould to have a mechanical strength sufficient to withstand at least atmospheric pressure, it is necessary to use a large volume of the material. The present invention provides a simplified mould that can be used as a chamber for treating the mortar under reduced pressure conditions. Thus, the mould is fabricated by plates and removable sealing members and the plates are removably connected to the pouring tank and the source of reduced pressure. After moulding, the mould is disassembled to subject the moulded product to a suitable curing treatment.

Another object of the present invention is to provide an improved apparatus capable of moulding products having irregular surfaces or complicated construction under a reduced pressure. Where the product has a large and complicated construction, it is difficult to evenly distribute the cast mortar over the entire surface of the product. Moreover, such complicated construction requires the use of complicated sealing members for the closed mould. The present invention contemplates the provision of an improved method and apparatus which is capable of assuring smooth pouring under a reduced pressure condition for products of complicated construction.

Another object of the present invention is to provide an improved apparatus for satisfactorily moulding tubular products or structures having openings for window passages or recesses. When moulding such products having openings or recesses under a reduced pressure, fabrication and handling are difficult due to complicated construction and reduced pressure. According to the present invention such difficulty can be obviated.

Another object of the present invention is to provide an improved apparatus for forming foundations for various buildings or the like and constructing roads. When constructing such foundations or roads, since it is necessary to use the ground as a portion of the mould it is difficult to mould the mortar under a reduced pressure condition. The present invention provides an improved method and apparatus for efficiently pouring mortar in such applications.

Still another object of the present invention is to provide an apparatus suitable for repairing cracks formed in concrete structures and for strongly joining concrete structures such as concrete pillars.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
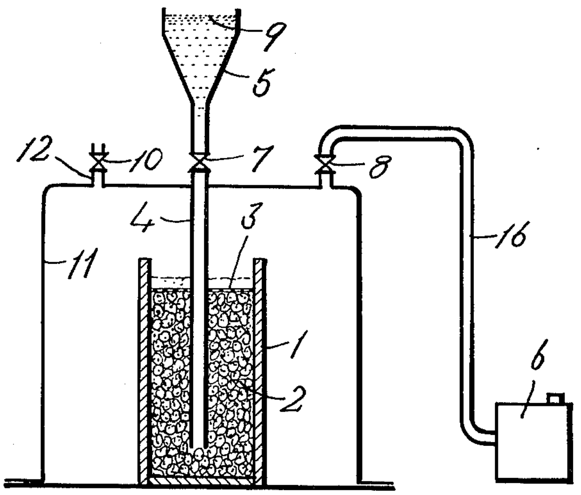
FIG. 1 is a diagrammatic sectional view of the basic embodiment of the present invention.
Figure 2:
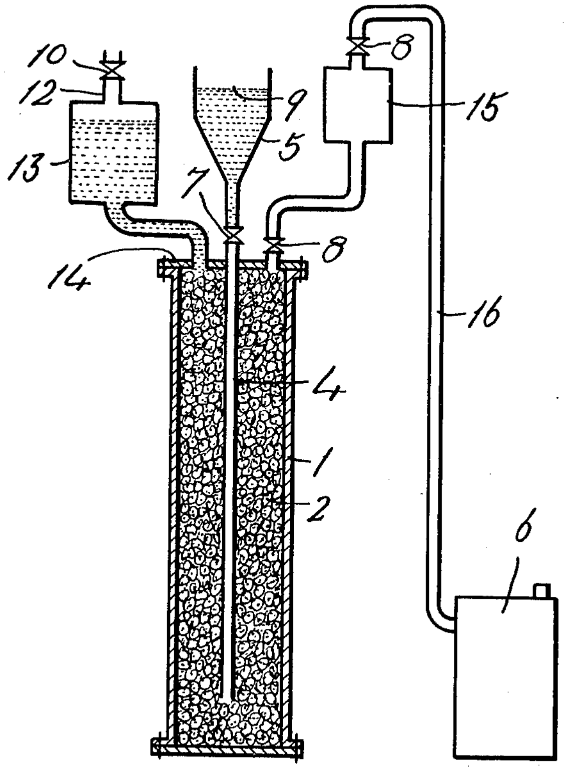
FIG. 2 is a diagrammatic sectional view of a modified embodiment of the present invention.

Referring now to the accompanying drawings, the basic embodiments of the present invention are illustrated in FIGS. 1 and 2. It is to be understood that FIGS. 1 and 2 merely illustrate the principle of the present invention. In the embodiment shown in FIG. 1, a reduced pressure chamber 11 independent of a mould 1 is used whereas in the embodiment shown in FIG. 2, a reduced pressure condition is created in the mould itself as will be described later. Each arrangement has specific advantages. More particularly, the mould 1 shown in FIG. 1 is not required to be provided with any particular sealing means whereas the arrangement shown in FIG. 2 does not require a large reduced pressure chamber so that the arrangement as a whole can be made small and compact. Accordingly, these arrangements can be selectively used according to the field of application of the present invention.

In the embodiment shown in FIG. 1, a suitable pressure reducing device 6, such as a vacuum pump is connected to the reduced pressure chamber 11 through a valve 8 and a pipe 16. There is also provided a vent opening 12 normally closed by a valve 10 for communicating the interior of the chamber 11 with the atmosphere. In the modified embodiment shown in FIG. 2, the pipe 16 and the vent opening 12 are provided in the mould 1. In this modification, the upper end of the mould 1 is closed by a lid 14 and a suitable cast mixture receiving chamber 13 having a suitable volume is interposed between the lid 14 and the vent pipe 12. In each embodiment a vertical casting or pouring tube 4 is provided at the center of the mould 1, the upper end of tube 4 being connected to a mortar hopper 5 through a valve 7. Thus, when the valve 7 is opened, the castable mixture, such as mortar 9 is poured into the mould. In the embodiment shown in FIG. 1 a perforated plate 3 is inserted into the mould after coarse aggregate 2 has been field introduced for the purpose of preventing the floating and displacement of the coarse aggregate when the mortar is poured into the mould 1. Of course, it is not necessary to use such perforated plate where coarse aggregate is not introduced into the mould beforehand. Where a reduced pressure chamber as shown in FIG. 1 is used, the chamber 11 should have sufficient strength and air tightness necessary to withstand the reduced pressure. Accordingly, the mould 1 is required to have a mechanical strength only sufficient to prevent the flow of the poured mortar out of the container. On the contrary, the mould 1 used in the embodiment shown in FIG. 2 should have sufficient mechanical strength and air tightness to withstand the reduced pressure. In the embodiment shown in FIG. 2, a sealed tank 15 is inserted in the pipe 16 for the purpose of preventing the mortar cast in the mould from flowing into the evacuating device b. Where the coarse aggregate 2 is preloaded in the mould 1 as illustrated, the mixture of course comprises mortar, but where the coarse aggregate is not preloaded, the mixture contains also the coarse aggregate.

Figure 3:
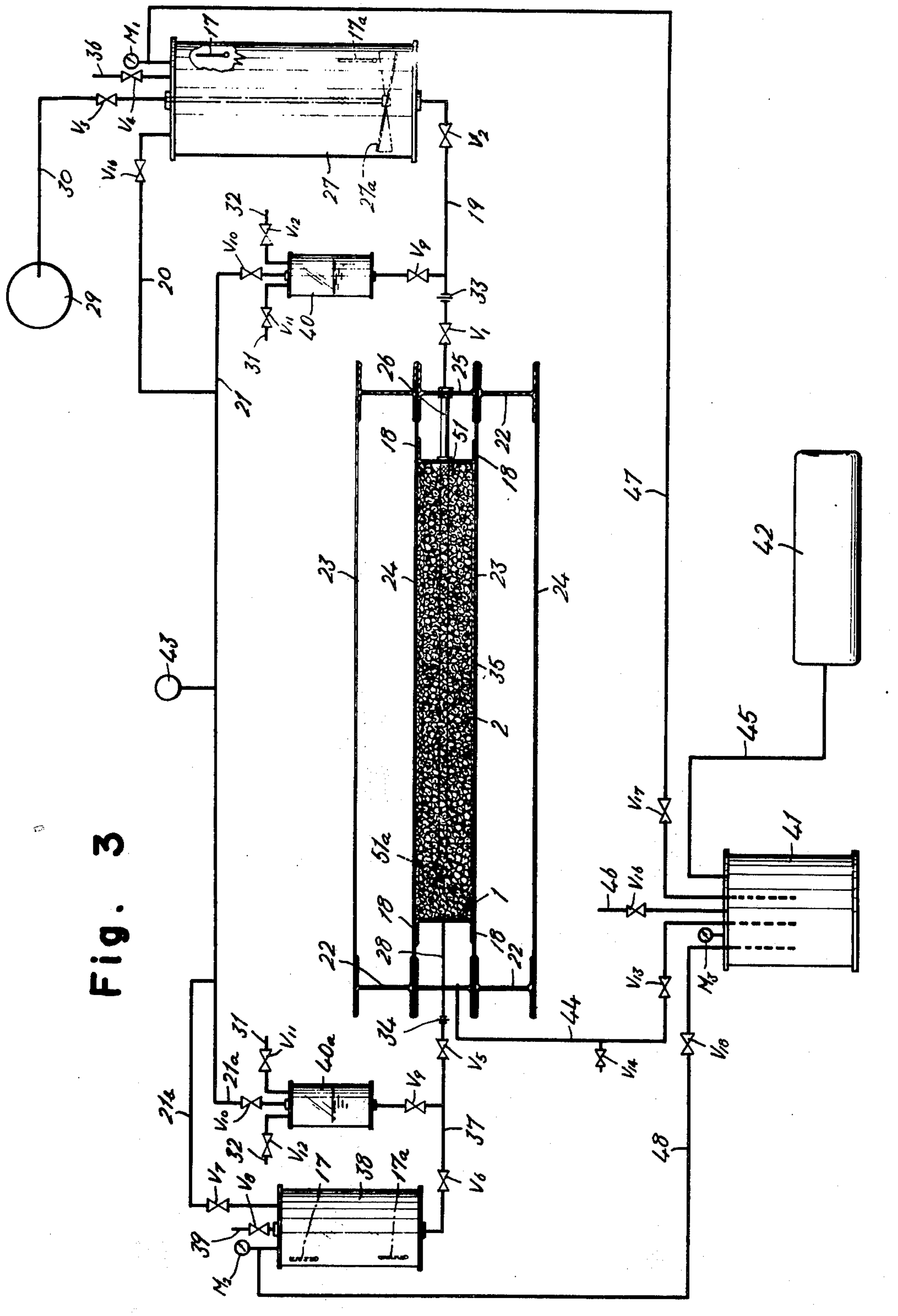
FIG. 3 is a general view showing the detail of the arrangement of various component parts of another embodiment of the present invention.

The embodiment shown in FIG. 3 is suitable for industrial applications. More particularly, beds 22 are provided on the upper and lower sides of the mould 1 which are closed by upper and bottom plates 23 and 24 respectively. The beds are sufficiently larger than the mould to accommodate the mould. The periphery of the mould 1 is formed by a partition member 25 having flat abutting surfaces 18, such as I or C shaped steel beam and suitable packing members, not shown, are interposed between the partition member 25 and the mould 1 at the abutting surfaces for providing an air tight seal. An inlet pipe 26 for the mixture is connected between one side of the mould 1 and the partition member 25 and the inlet pipe 26 is removably connected to a closed tank 27 through a connecting pipe 19 including valves $V_1$ and $V_2$ and a coupling 33. A conduit 30 from an open tank 29 is connected to the top of the closed tank 27 through a valve $V_3$. To the tank 27 are also connected a vent pipe 36 including a valve $V_4$, a reduced pressure pipe 47 which is connected to a source of reduced pressure 42 through a valve $V_{17}$, an air-liquid separating tank 41 and a pipe 45, and a pressurizing pipe 20 connected to a source of pressure 43 via a valve $V_{15}$.

An indicating or overflow tank 38 positioned above the mould 1 is connected to the opposite end thereof through connecting pipes 28 and 37, valves $V_5$ and $V_6$ and a coupling 34. To the indicating tank 38 are also connected a vent pipe 39 including a valve $V_8$, a reduced pressure conduit 48 including a valve $V_{18}$ and connected to the air-liquid separating tank 41, and a pressurizing conduit **21*b* including a valve $V_{10}$ and connected to the source of pressure 43. Another reduced pressure pipe 44 provided with an intermediate valve $V_{13}$ and an air inlet valve $V_{14}$ is provided between the air-liquid separating tank 41 and the partition member 25. Further, a vent pipe 46 having a valve $V_{16}$ is also provided for the air-liquid separating tank 41. Closed liquid tanks 40 and 40*a* are connected to connecting pipes 19 and 37, respectively, through valves $V_9$. The source of pressure 43 is connected to the liquid tanks 40 and 40*a* through pipes 21 and 21*a* and valves $V_{10}$ respectively. Vent pipes 31 including valves $V_{11}$ and vent pipes 32 including valves $V_{12}$ are also provided for the liquid tanks 40 and 40*a*. The packing members interposed between the mould 1, partition member 25 and the top plate 23 and bottom plate 24 of the beds 24 at the abutting surfaces 18 preferably comprise a dual sealing construction including a mortar sealing member and a tongue shaped air sealing member which are automatically compressed together by the atmospheric pressure when the inside of the mould 1 is evacuated thereby enhancing the sealing function. However, if the abutting surfaces 18** were precicely finished it would not be necessary to use the mortar sealing member.

The closed tank 27 is provided with stirring blades **27*a* for stirring the mortar admitted into tank 27. Hemispherical or cylindrical metal wire net 51 or 51*a* is provided to cover the opening of the inlet pipe 26 in the mould 1 for preventing the preloaded coarse aggregate 2 from entering into the inlet pipe 26. The closed tank 27, the indicating tank 38, and the air-liquid separating tank 41 are provided with pressure meters $M_1$, $M_2$ and $M_3$, respectively, to display the pressure in respective tanks. Where the volume of the mould is large, 10 $m^3$ for example, the inner end of the inlet pipe 26 is caused to extend through the coarse aggregate 2. In this case, the extension of the inlet pipe 26 is left in the cast concrete product, and the end of such extension is of course covered by cylindrical metal wire net 51*a* to prevent the coarse aggregate from entering thereinto. Each of the closed tank 27 and the indicating tank 38 is provided with upper and lower mortar indicators 17 and 17*a*. In the case of tank 27, supply of the mortar to the tank 27 from the tank 29 can be controlled by observing the level of the mortar through these indicators 17 and 17*a***.

The apparatus shown in FIG. 3 operates as follows. Like the conventional prepacking process, the coarse aggregate 2 is packed in the mould 1 before casting of the mortar. For the purpose of preventing the coarse aggregate from contacting directly with the upper plate 23 of the lower bed 22 thereby causing a coarse surface in the cast cement product, it is advantageous to apply a thin coating of mortar 35 on the bottom surface of the mould 1 and then add the coarse aggregate 2. The coarse aggregate 2 is packed to a level slightly lower than the top edge of the mould 1. Such prepacked coarse aggregate has a larger density than that of ordinary concrete product. Upon completion of the packing of the coarse aggregate 2, the upper bed 22 is mounted to cover the mould 1 and the upper and lower beds and the mould 1 are clamped together by suitable clamping means, not shown, with suitable sealing members interposed at the abutting surfaces 18. Where tongue shaped sealing members which are held at an inclined position under normal condition are used, when the upper and lower beds 22 are clamped to the mould, the inclined sealing members are also clamped therebetween thus forming air tight seals. Moreover, when the inside of the mould 1 is evacuated, as the upper and lower beds are urged against the mould by the atmospheric pressure, the sealing members are clamped more tightly thereby enhancing the sealing effect.

Then, while maintaining valves $V_1$ and $V_5$, or valves $V_1$, $V_9$ and $V_6$ or valves $V_9$, $V_7$ and $V_8$ in the closed state, the valve $V_{13}$ in the reduced pressure conduit 44 is opened to reduce the pressure in the partition member 25 and hence the mould 1. The degree of pressure reduction should be high as far as possible for the purpose of removing air in the mould, especially in the interstices in the coarse aggregate but should not be too high in order to avoid the necessity of installing an expensive evacuation system. Generally, the reduced pressure is of the order of less than 0.5 $Kg/cm^2$, preferably from 0.1 to 0.3 $Kg/cm^2$. concurrently with, or before or after such evacuation, the pressure in the tanks 27 and 38 is also suitably reduced, and a suitably blended mixture of mortar is admitted into the tank 27 from tank 29 by opening valve $V_3$.

To observe the degree of pressure reduction of the mould 1 we have substituted a transparent member for the upper bed 22 to close the mould 1 and a fine powder was sprinkled into the mould 1 and the partition member 25. Then, when the pressure reduction proceeds to a certain degree, a violent flow of the air was noted in the space between the mould 1 and the partition member 25 in which the reduced pressure conduit 44 opens directly, but the air in the mould 1 containing the coarse aggregate was substantially stagnant. This means that the pressure in the space between the mould and the partition member was highly reduced whereas that in the mould was not reduced so highly. Thus, an intermediate chamber of a reduced pressure is formed between the atmosphere and the mould 1 so that even when certain amount of air leaks into this intermediate chamber,the pressure in the mould 1 will not be affected to any appreciable extent.

After confirming that the pressure in the mould 1 has been reduced to the desired value, valves $V_1$ and $V_2$ are opened and the valve $V_{17}$ is closed. Then, the mortar in tank 27 is poured into the mould 1 under a pressure difference. At this time, when the valve $V_4$ is also opened, the atmospheric pressure will cooperate with the pressure difference to pour the mortar at a higher speed thereby more efficiently pouring the mortar throughout the entire volume of the mould. However, care should be taken to avoid occurrence of closing phenomena (to be described later) which were confirmed by a number of field experiments performed by the inventors. For this reason, it is important to reduce the pressure difference between the external atmospheric pressure and the pressure prevailing in the mould 1 at the time of starting the pouring operation of the mortar. Generally, at the commencement of pouring, it is advantageous to slowly pour the mortar contained in the closed tank 17 which is generally positioned more than 1 meter above the mould 1, under the difference in the head. Where the coarse aggregate 2 is packed in the mould 1 and the pressure in the coarse aggregate is reduced as described hereinabove, it is advantageous to decrease the pressure in the mould to a substantial degree. Then, the pressure difference between inside of the mould and the outside atmosphere increases. If the mortar were poured under such a large pressure difference, the prepacked coarse aggregate would not only flow, but also resist against the flow of the mortar. Relatively high viscosity of the mortar also decreases its fluidity. Impregnation of the poured mortar into the coarse aggregate starts from the opening of the inlet pipe 26 and the mortar gradually decreases its fluidity due to dehydration and deviation caused by the reduced pressure. For this reason, at the time of commencing the pouring operation, closing phenomenon was noted. More particularly, at the commencement of the pouring, the cross-sectional area of the flow of the mortar through the coarse aggregate rapidly increases from the end of the inlet pipe 26 and the reduced pressure causes evaporation of water thus decreasing the fluidity of the remaining fine aggregate such as sand. Such fine aggregate of increased viscosity accumulates at the exit end of the inlet pipe. Moreover, such accumulated fine aggregate functions as a filter to pass only the water component of the succeeding mortar thus creating the closing phenomenon described above. When such phenomenon occurred actually, we stopped the operation and opened the mould. Upon inspection, we found that in each case there was formed a solidified layer consisting essentially of the fine aggregate or sand at the exit end of the inlet pipe 26. When such solidified layer is once formed it is impossible to further pour the mortar in the mould so that it is necessary to open the mould so as to remove the solidified layer as well as the prepacked coarse aggregate 2. The apparatus shown in FIG. 3, however, can efficiently prevent occurrence of such closed condition. Means effective for this purpose first comprises the closed tank 27 in which suitable reduced pressure condition is established on the pouring or upper side. In other words, it is possible to commence the pouring operation by maintaining substantially the same reduced pressure condition in both the mould 1 and the closed tank 27. This can be accomplished by connecting the upper side of the tank 27 to the air-water separation tank 41 through pipe 47.

The second method of preventing the occurrence of the closed condition comprises the steps of commencing the pouring of the mortar while preventing further decrease of the pressure in the mould 1 and then continuing the pouring by rapidly increasing the pressure in the mould. This method, however, requires substantial skill and can not produce cast products of uniform quality. However, by using the closed tank 27 it is possible to select any pressure difference between it and the mould 1. It is also possible to start to pour by using only the head difference provided by the level of the closed tank 27. So far as the pouring operation is concerned, the pouring under the head difference and the pouring under the pressure difference may be considered the same. However, quality of the product differs considerably due to the composition of the mortar and the action of gravity. Actually, however, it is important to commence the pouring by reducing the pressure difference in the mould 1 and the inlet or pouring portion for the purpose of satisfactorily pouring without creating the undesirable closing condition. It is also important to form an area not filled with the course aggregate by covering the exit end of the inlet pipe 26 with a metal wire net or the like as described above. With this construction, immediately after pouring the mortar is not required to pass through the narrow interstices between the coarse aggregate. Instead, the poured in mortar is allowed to expand at the exit end and then caused to flow through the interstices in the course aggregate 2. For this reason, the poured mortar does not clog the coarse aggregate. We have substituted a transparent member for the upper bed 22 for the purpose of observing the expansion and flow condition of the poured mortar and whether the closing phenomenon occurs or not, and found that it is advantageous to suitably control the propagation of the leading end of the mortar. More particularly, it is essential to control the propagation such that the leading end moves continuously to the forward direction. Once such propagation is stopped, the moisture in the mortar will be absorbed by the coarse aggregate and removed by the reduced pressure thus causing closing phenomena. It is necessary to carefully control the pouring operation so as to maintain constant speed of propagation. If the speed is too fast, water and sand separate from each other, whereas if the speed is too slow the closing phenomena would be resulted due to absorption of water by the coarse aggregate. As long as the leading end of the mortar propagates at a suitable speed, immediately after the water component of the mortar has been absorbed by the course aggregate 2 the mortar will successively fill the narrow interstices of the coarse aggregate thus assuring dense or void free cast products.

As the pouring operation proceeds, the pouring speed due to the head difference gradually decreases and finally reduces to zero. Such gradual decrease in the pouring speed can be detected by the mortar detector **17*a* provided for the tank 27. Such pouring condition can also be supervized by providing a transparent window for the tank 27. In any case, when the pouring speed caused by the head difference decreases to a predetermined value, the vent valve $V_4$ is opened to admit the atmosphere into the tank 27 to add the atmospheric pressure to the head difference thereby increasing the pouring speed. If desired, the increase in the pouring speed caused by the admission of the atmosphere may be carried out in a plurality of steps thus assuring satisfactory filling of the mould without accompanying the undesirable closing condition. After the mould has been partially filled with the mortar, the valve $V_4$ may be fully opened for continuing the pouring operation under the atmospheric pressure alone. It was found that no closing phenomenon occurs under this condition. In the arrangement shown in FIG. 3, indicating tank 38a is connected to the mould 1 on the side opposite to the pouring side at a level higher than the mould. This indicating tank 38 is also made of transparent material or at least provided with a transparent window for enabling to observe the inside condition. As described above, since the inside of this tank is also under a reduced pressure condition, when valves $V_5$ and $V_6$ are opened during the pouring operation of the mortar, the mortar overflowing from the mould 1 enters into the indicating tank. Due to the reduced pressure prevailing in the indicating tank 38, the mortar ejects thereinto. Especially, when the mortar first enters into the tank 38 a vigorous ejection occurs. However, as a sufficient quantity of the mortar is poured into the mould by using the atmospheric pressure, the speed of ejection is decreased. At this time, it is evident that the mould is completely filled with the mortar. Where it is desired to pour the mortar into the mould under pressure, valves $V_{17}$, $V_{13}$; $V_3$, $V_{18}$ are closed whereas valves $V_7$ and $V_{15}$ are opened at this time to apply pressure in closed tank 27 and 38 from the source of pressure 43 and thereby apply pressure to the inside of the mould 1** through the mortar contained in these tanks.

The apparatus shown in FIG. 3 can be operated continuously. More particularly, an additional mould and bed may be positioned above or beneath one of the beds 22 shown in FIG. 3. In this manner, by adding a suitable number of moulds and beds and by switching the connection between respective moulds and the tanks 27 and 38 by means of couplers 33 and 34, the plurality of moulds can be operated sequentially.

The pouring device can be modified as shown in FIGS. 4 through 11. As has been pointed out hereinabove, it is essential to decrease the pressure in the mould as far as possible for the purpose of eliminating excessive water and entrained air in the mixture to be poured into the mould. However, as the pressure difference between the inside and outside of the mould increases, the ingredients of the mixture began to separate from each other, especially at the commencement of pouring thus resulting in the undesirable closing phenomena. To obviate these phenomena it is advantageous to provide a cushion action. In the arrangement shown in FIG. 3, this cushion action is provided by the closed tank 27. Thus, by establishing a suitable reduced pressure in the tank 27, the pressure difference between the inside and outside of the mould is decreased.

Figure 4:
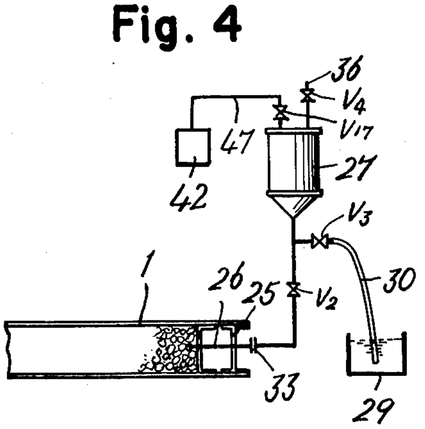
FIG. 4 is a diagrammatic representation of a first embodiment of the pouring apparatus.

In the modification shown in FIG. 4, an open tank 29 is connected at a juncture 49 to the outlet conduit 19 from the closed tank 27 via a pipe 30 including a valve $V_3$. With this modification, when the valve $V_1$ is closed, the castable mixture or mortar contained in tank 29 is sucked up into the closed tank 27. Then by partially or completely closing the valve $V_3$ and by opening valve $V_1$, the mixture in the tank 27 is poured into the mould 1.

Figure 5:
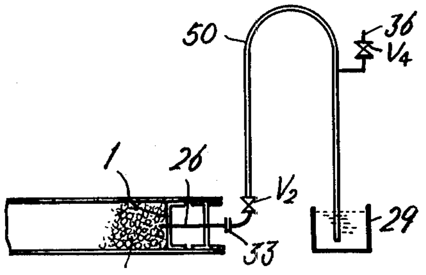
FIGS. 5 to 11 show still other modifications of the pouring apparatus.

FIG. 5 shows another embodiment of the pouring device which does not utilize a closed tank as in the embodiments shown in FIGS. 3 and 4. Thus, a cushion member 50 in the form of an inverted U shaped tube is included in the connecting pipe 19 provided with valve $V_1$ and the free end of the U shaped tube is immersed in the open tank 29. Similar to the embodiment shown in FIG. 1, the source of reduced pressure is connected to the mould 1. In both embodiments shown in FIGS. 4 and 5, the mortar is poured into the mould by the head difference between the mould 1 and the closed tank 27 or cushion member 50. However, the construction of the pouring device shown in FIG. 5 is more simple.

Figure 6:
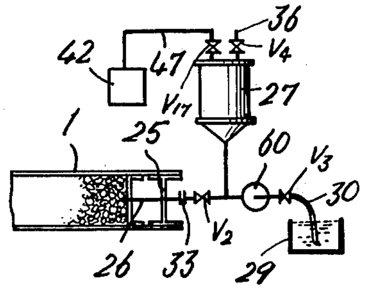

In the case shown in FIG. 6, the pouring device comprises a pressure feed mechanism such as a sealed type pump 60. However pouring of the mortar is not effected directly by the pump 60 but in the same manner as in the embodiment shown in FIG. 4. Thus, the mortar is once sent to the closed tank 27 and then poured into the mould 1 under the head difference. Thus the tank 27 provides the cushion effect required.

Figure 7:
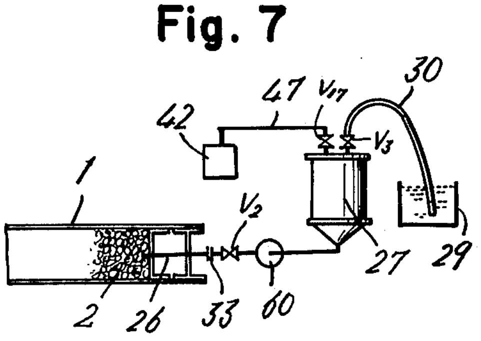

In the embodiment shown in FIG. 7 the pressure feed mechanism 60 is used to provide the necessary cushion effect in corporation with the closed tank 27. More particularly, in the embodiments shown in FIGS. 4 to 6, the pouring speed or pressure of the mortar is governed by the head difference between the level of the mortar in the closed tank and that of the mould 1, whereas in the embodiment shown in FIG. 7, since the pressure feed mechanism 60 is interposed between the closed tank 27 and the mould 1, the pouring speed or pressure of the mortar is governed essentially by the pressure feed mechanism 60. Accordingly, even in a case wherein there is no head difference between the closed tank and the mould, an adequate pouring speed can be assured provided that the pressure in the closed tank is sufficiently reduced.

Figure 8:
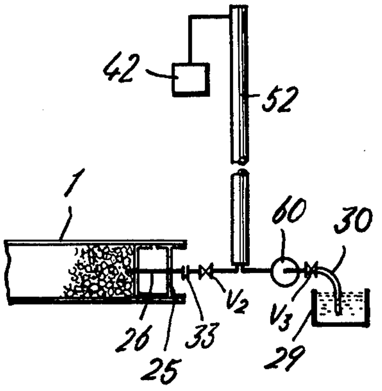

In the modification shown in FIG. 8, a simple cylinder 52 is used to provide the cushion effect. Thus, the mortar in the open tank 29 is transferred into cylinder 52 by means of a pump 60 and the head of the mortar in the cylinder 52 is used to pour the mortar into the mould 1. By the suitable adjustment of the opening of valve $V_1$ and the output of pump 60 it is possible to pour under a constant head. Further, when the head is varied during the initial stage and the final stage of the pouring operation, it is possible to obtain pouring conditions suitable for such stages.

Figure 9:
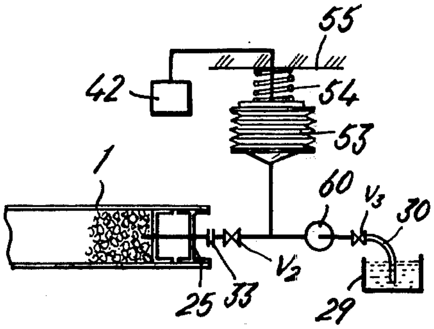

In still another modification shown in FIG. 9 the desired cushion effect is provided by a bellows 53 connected between the pump 60 and the mould 1. The bellows 53 is biased by a spring 54 interposed between it and a stationary member 55. The bellows 53 expands and contracts in accordance with the variation in the output pressure of the pump 60 so as to assure a constant pouring speed of the mortar. Where the output pressure of the pump varies frequently about a predetermined value, it is possible to provide means which is arranged to respond to the degree of expansion and contraction of the bellows 53 for adjusting the source of low pressure 42, that is its function to the mould 1.

Figure 10:
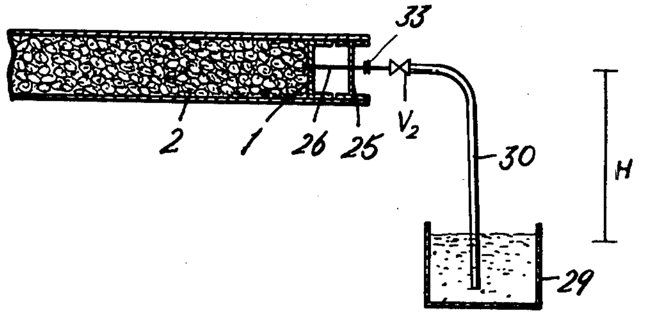

In the case shown in FIG. 10 the desired cushion effect is provided by disposing the mould 1 at a higher level than the open tank 29 which contains the mortar. More particularly, when the pressure in the mould 1 is reduced as described above, the injection speed of the mortar into the mould 1 is governed by the head H. In other words, the injection speed can be adjusted by varying the head H, and it will be clear that due to this head, the time of actual pouring is delayed than the time of reduction in the pressure within the mould 1.

Figure 11:
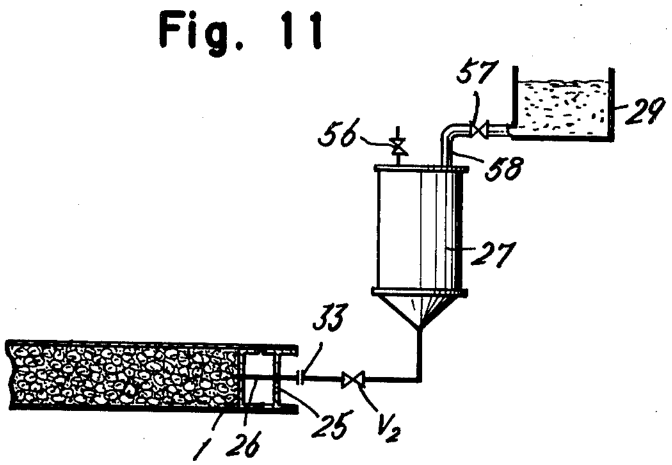

In the modification shown in FIG. 11 although the open tank 29 is positioned above the closed tank 27 in the same manner as that shown in FIG. 3, the closed tank 27 is not connected with the source of pressure 43 or source of reduced pressure 42 but instead provided with only a simple vent valve 56 which corresponds to valve $V_4$ shown in FIG. 3. In operation valve $V_1$ is closed and valves 56 and 57 are opened. Then, the mortar in open tank 29 flows into tank 27 by gravity and the air in tank 27 escapes to the atmosphere through valve 56. Then valves 56 and 57 are closed whereas valve $V_1$ is opened to cause the mortar in tank 27 to flow into the mould 1 by gravity. The partial vacuum created at this time on the upper portion of the closed tank 27 provides the desired cushion action. If the partial vacuum becomes too high to prevent effective pouring, the valve 56 is opened slightly. When the mortar enters into indicating tank 38 (not shown in FIG. 11 but is connected to the lefthand side of the mould 1) valve 56 is opened fully to compact the mortar poured in the mould 1 by the atmospheric pressure. It will thus be clear that in the modification shown in FIG. 11, without connecting the closed tank 27 to a source of reduced pressure a partial vacuum is created automatically in the tank 27 as the mortar is poured into the mould and that this partial vacuum provides the desired cushion effect.

Figure 12:
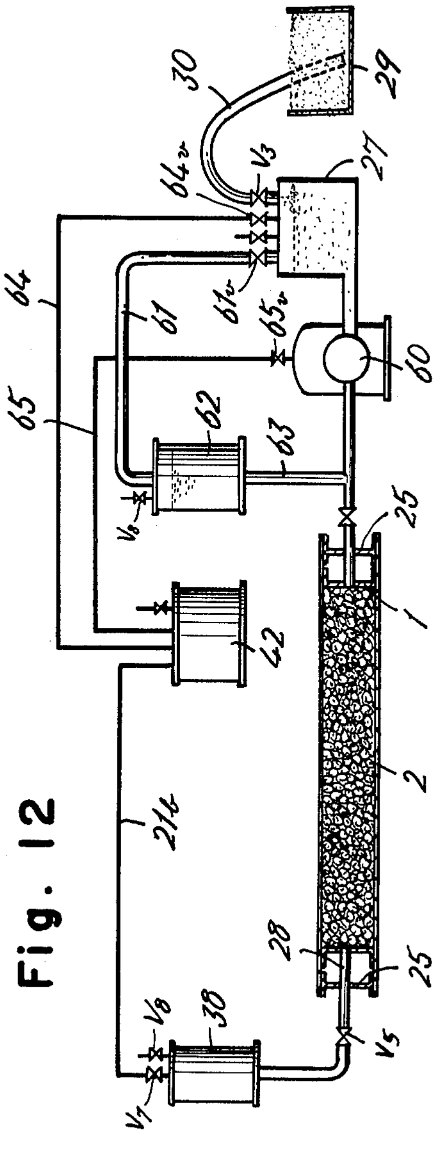
FIG. 12 is a diagrammatic representation of a modified embodiment of the present invention wherein a pump is used in the pouring apparatus.
Figure 14:
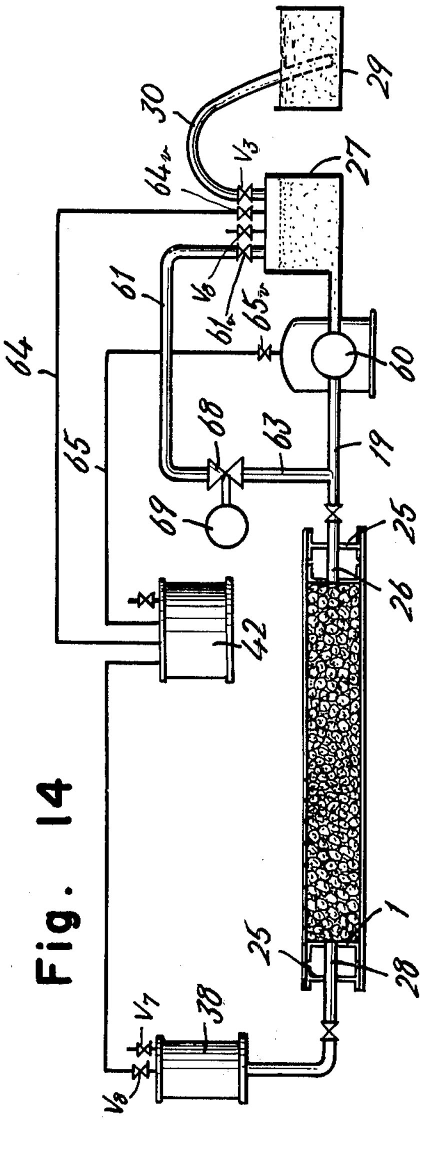
FIGS. 13 and 14 are diagrams showing modifications of the embodiment shown in FIG. 12.
Figure 13:
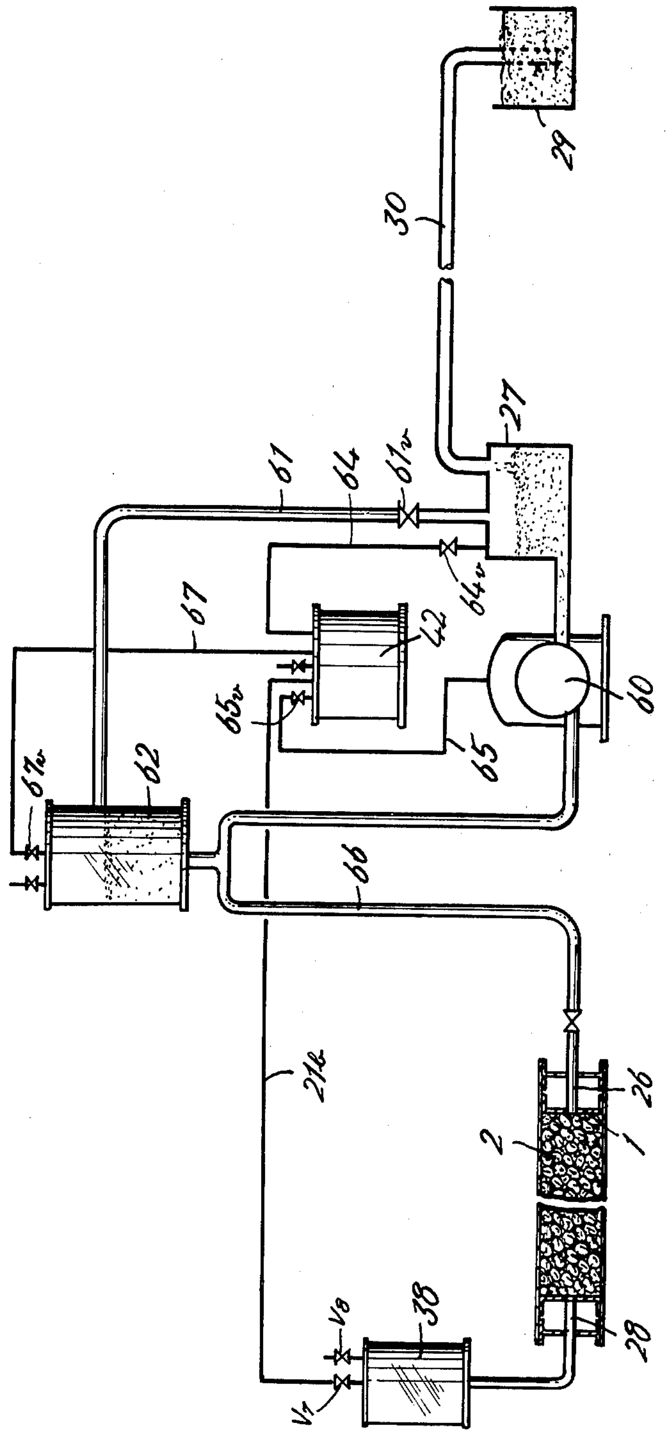
Figure 15:
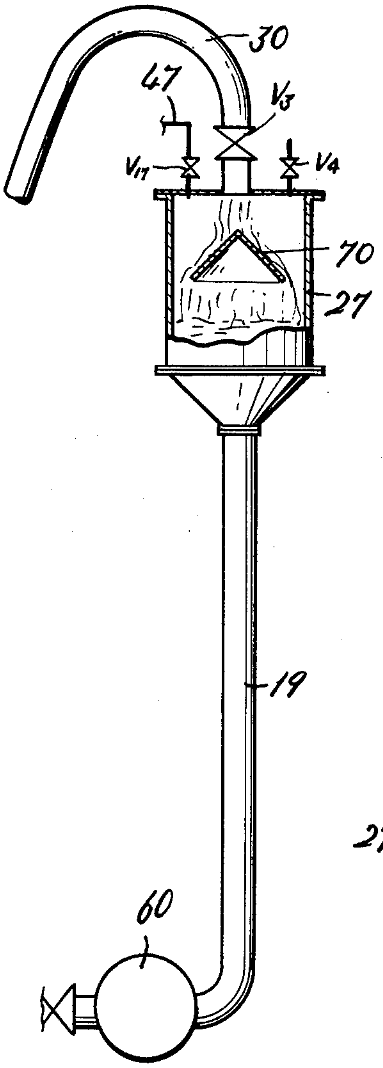
FIG. 15 is a side view, partially in section of the pouring apparatus utilizing means for spreading mortar for the purpose removing excess water and air.

FIGS. 12 through 14 illustrate more preferred examples of the pressure feed mechanism for use in the pouring device, wherein a circulating conduit is used for returning excess castable mixture or mortar back to the closed pouring tank for ensuring adequate pouring condition as well as adequate flow condition of the mixture in the conduit. Moreover, the spacings between the closed pouring tank, open tank and mould are made to be sufficiently large and the pressure feed mechanism is also used to compact the mortar after it has been poured into the mould.

In the embodiment shown in FIG. 12, a closed type mould 1 is used and the coarse aggregate 2 is packed therein. A closed pouring tank 27 is connected to one side of the mould 1 through a valve $V_1$ and a pipe 19 whereas an indicating tank 38 is connected to the other side through a pipe 28 and a valve $V_5$. The closed tank 27 is connected to an open tank 29 via a pipe 30 and a valve $V_3$ in the same manner as in the embodiment shown in FIG. 3, and a closed pressure mechanism shown as a pump 60 is interposed between the tank 27 and the mould 1 in the same manner as in the embodiments shown in FIGS. 6 and 7. A circulation conduit 61 including a closed tank 62 utilized for pressure regulation is provided between the pipe 19 and the closed tank 27. The source of reduced pressure 42 is connected to the tank 27, pump 60 and indicating tank 38 through pipes 64, 65 and 21*b*, respectively. These pipes are provided with valves 64*v*, 61*v* and $V_9$ respectively. Further, tanks 27, 62 and 38 are provided with vent valves $V_8$, respectively. In operation, after packing the coarse aggregate 2 in the mould, if desired, valves $V_9$ and 64*v* are opened to connect the source of reduced pressure 42 to tanks 38 and 27 to reduce the pressure therein to a pressure of above 400 - 100 mm Hg. Then valve $V_3$ is opened to suck up the mortar in tank 29 into the closed tank 27. Thereafter the pump 60 is started to pour the mortar in the tank 27 into the mould 1. However, as the circulating conduit 61 is connected between pipe 19 and the closed tank 27, before valve $V_1$ is opened the mortar is merely circulated through the circulating conduit 61 so that there is no fear of increasing the output pressure of the pump 60 to a dangerous value. In other words as it is possible to always maintain a desired pouring pressure, as soon as the valve $V_1$ is opened, the mortar is poured uner an adequate condition. At this time it is advantageous to maintain the pressure in the mould 1 at a pressure lower than the pressure in the tank 27 by about 100 - 200 mm Hg so as to assure smooth pouring of the mortar. When the mortar enters into the indicating tank 38 from the mould, the vent valves $V_8$ for respective tanks 38, 62 and 27 are opened to compact the cast mortar. By operating the pump 60 while valves 61*v*, 64*v* and 65*v* are being closed, it is possible to increase the pouring pressure of the mortar into the mould.

The embodiment shown in FIG. 13 is generally similar to that shown in FIG. 12 except that an inverted U shaped pipe section 66 having a suitable height is provided for pipe 19 and that the head of the U shaped pipe section 66 is connected to the closed tank 27 through the pressure regulating tank 62 and the circulating conduit 61. In this case the circulating conduit 61 is connected to an intermediate point of the pressure regulating tank 62, and a reduced pressure conduit 67 including a valve 67*v* is connected between the pressure regulating tank 62 and the source of reduced pressure 42.

In the embodiment shown in FIG. 13 when the castable mixture or mortar reaches at the level in the pressure regulating tank 62 at which the circulating conduit 61 opens the mixture is returned to the closed pouring tank 27 through conduit 61. Consequently, the pouring speed of the mortar into the mould 1 is determined essentially by the difference in the levels of the opening of the conduit 61 in the tank 62 and the pipe 19 so that it is possible to pour the mortar under a desirable definite condition by selecting this level difference to a suitable value. Where it is desired to use higher pouring pressure, the valve 61*v* in the circulating conduit 61 is closed thus preventing circulation of the mortar. In this manner, it is possible to provide a definite pouring pressure irrespective of the distance between the pump 60 and the closed pouring tank 27 and open tank 29. This enables efficient pouring of the mortar from a distant point, for example a point 50 meters spaced apart. Accordingly, it is possible to pour mortar into a mould located at a deep position of a building or tunnel, to which a truck for conveying the mortar can not access, from the entrance of the building or tunnel.

FIG. 14 shows still another modification of the present invention wherein instead of using a pressure regulating tank 62 as in FIg. 13, a pressure regulating valve 23 is included in the vertical portion 63 of the circulating conduit 61. The pressure regulating valve 23 is such that it opens automatically when the pressure in the pipe 19 exceeds a predetermined value thereby returning a portion of the output of the pump 60 back to the closed tank 27.

Figure 16:
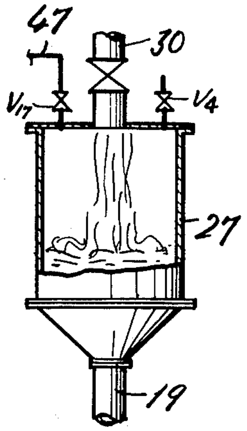
FIGS. 16 through 19 show side views, partially in section, of modified spreading means.
Figure 17:
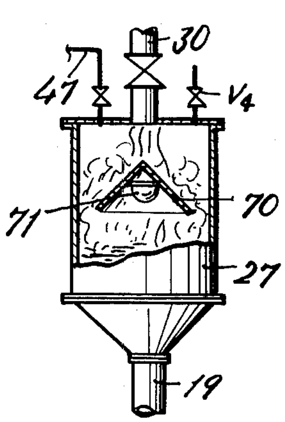

FIGS. 15 to 19 show some examples of the apparatus for removing excess water and entrained air from the castable mixture. In the example shown in FIG. 15, a spreader 70 having a triangular cross-section is disposed in the closed tank 27 beneath pipe 30 from open tank 29 (see FIG. 4). While the mortar is caused to flow over the surface of the spreader 70, excess water and air entrained therein are efficiently removed by the reduced pressure created in the tank 27 by the source of reduced pressure 42 (see FIG. 4). As shown in FIG. 17 a suitable vibrator 71 may be provided for the spreader for enhancing the action of removing excess water and entrained air.

Figure 18:
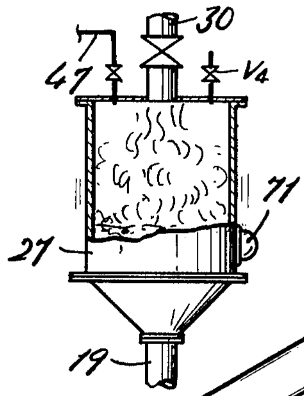
Figure 19:
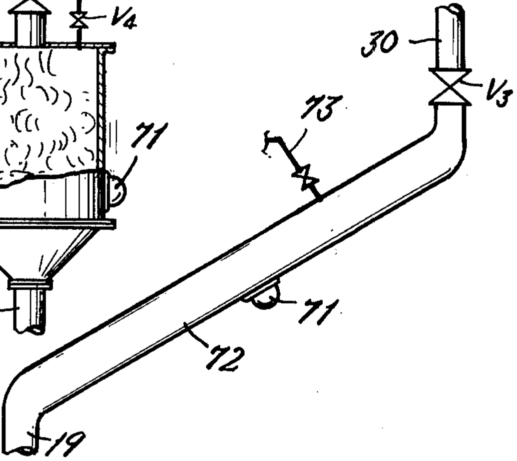

In the example shown in FIG. 16, instead of using a spreader the valve $V_3$ is constructed as a throttle valve so as to cause the mortar to drop into the reduced pressure atmosphere in the closed tank. The example shown in FIG. 18 is identical to that shown in FIG. 16 except that at vibrating mechanism 71 is mounted on the outside of the closed tank 27 so as to vibrate the same for the purpose of removing excess water and entrained air. In the example shown in FIG. 19, an inclined pipe 72 is connected to the lower end of the pouring pipe 19 though a valve 19*v*. The inclined pipe is connected with the source of reduced pressure 42 (see FIG. 3) through a pipe 73 and is vibrated by a vibrating mechanism 71.

By using either one of the apparatus shown in FIGS. 15 to 19, it is possible to remove excess water and entrained air from the mortar, even when it has a high fluidity, its fluidity is decreased during its pouring step so that it is possible to prevent such disadvantages caused by the oozing of excess water.

Figure 20:
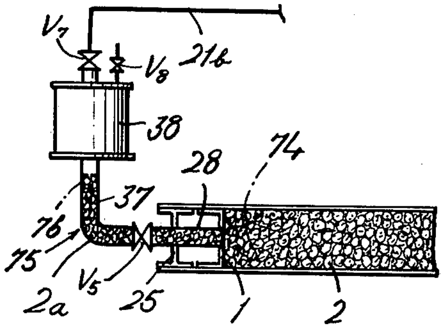
FIG. 20 is a side view, partially in section, showing the manner of packing flow resistance material in an overflow mechanism.

In the modifications shown in FIGS. 20 through 23 certain improvements are made for ensuring perfect pouring. In the arrangement shown in FIG. 3, for example, we have found that in a region 74 shown in FIG. 20, which is the end of the mould 1 connected to the indicating tank 38, the mortar is not perfectly poured. More particularly as shown in FIG. 3, since the indicating tank 38 is connected to the source of reduced pressure 42, the pressure in the region 74 is also reduced so that the mortar poured in this region is sucked into the indicating tank 38. According to this invention, in order to eliminate this difficulty a pipe 75 packed with flow resistance material *2a* such as a coarse aggregate is interposed between the indicating tank 38 and the mould 1. As shown in FIG. 20, the coarse aggregate *2a* is packed in the pipe 75 to a level slightly higher than that of the mould 1. A metal wire net 76 is provided in pipe 76 the bottom of tank 38 for preventing the packed coarse aggregate *2a* from filling the indicating tank 38.

Figure 21:
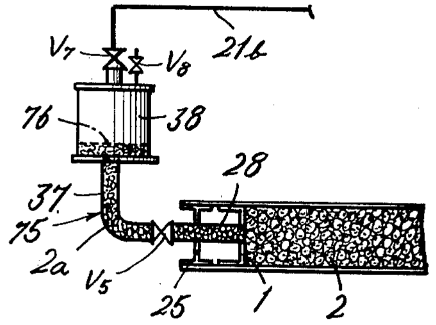
FIG. 21 shows a modification of FIG. 20.

In the embodiment shown in FIG. 21 the metal wire net 76 is provided in the lower portion of the tank 38.

Figure 22:
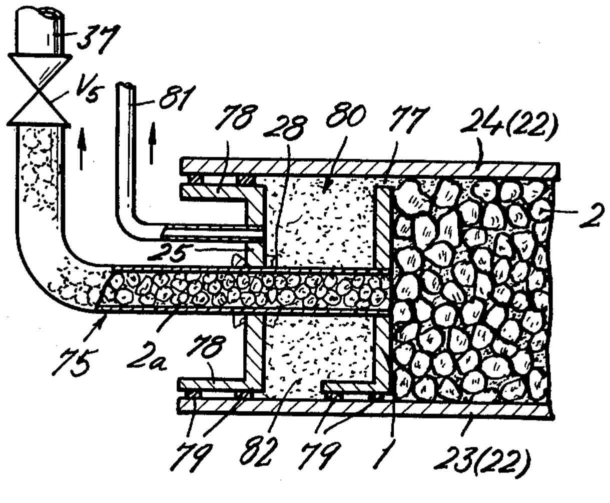
FIGS. 22 through 24 show still another modified overflow mechanism.

FIG. 22 shows another embodiment which is suitable for a case where excess water still remains in the cast mortar when its pouring has been completed. Thus, the inner end of pipe 75 is extended into one end of the mould 1 and a partition plate 24 is mounted on the end of the pipe 75 thus forming an absorption chamber 80 between the partition plate 25 and the end plate 25 of the mould 1. The absorption chamber 80 is filled with a suitable absorbing material 82 such as sand, and is communicated with the remaining portion of the mould through a narrow gap 77 (about 1 mm) about the partition plate 24 for receiving the oozing water. The absorption chamber 80 communicates with the source of reduced pressure 42 (see FIG. 3) through a pipe 81. The absorption chamber 82 is packed with filter substance 80 for air and water, sand for example.

Figure 23:
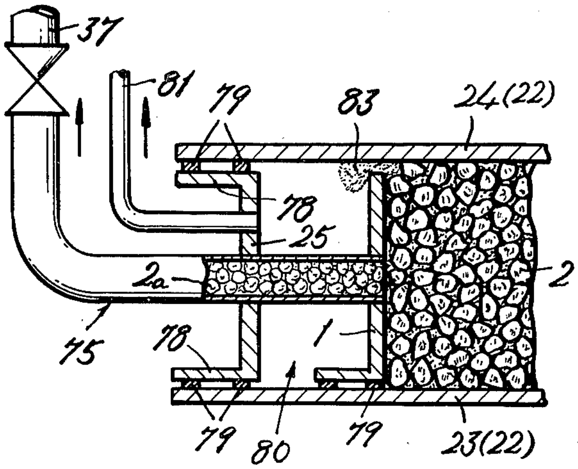
Figure 24:
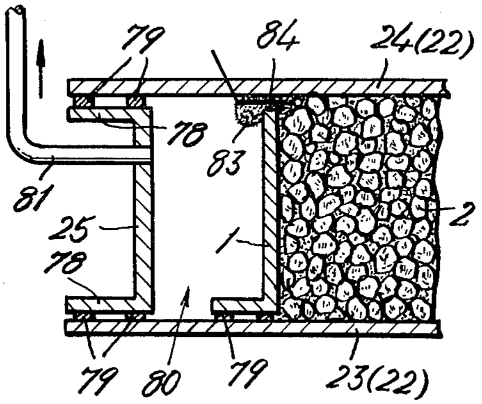

FIGS. 23 and 24 illustrate other examples of the apparatus for preventing formation of not completely filled regions. The embodiment shown in FIG. 23 is identical to that shown in FIG. 22 except that a filter material 83 comprising spongy synthetic resin, for example, is mounted in the gap 77 for passing the oozed water. In the example shown in FIG. 24 pipe 75 leading to the indicating chamber 38, shown in FIGS. 21 - 23 is omitted, and a mortar detector 84 is mounted in the upper portion of the region where pouring is not complete. In this embodiment the suction applied through the indicating tank 38 does not occur, and completion of the pouring of the mortar is detected by the mortar detection 84.

Figure 25:
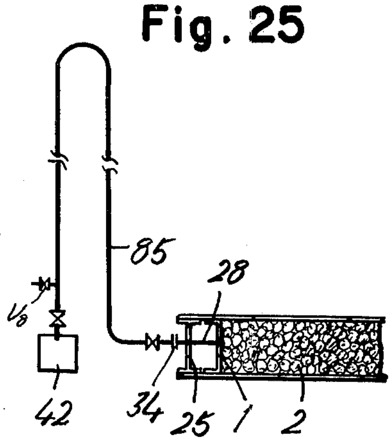
FIG. 25 is a diagram showing an arrangement for detecting an overflow condition by means of a mortar detector.
Figure 26:
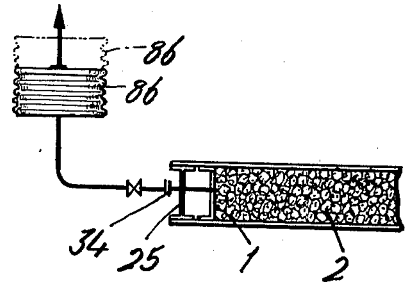
FIGS. 26 through 28 show modified examples of the overflow mechanism.
Figure 27:
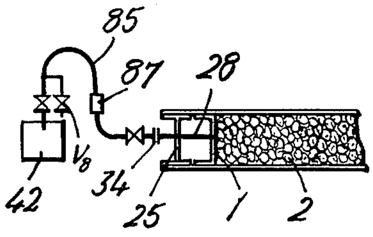
Figure 28:
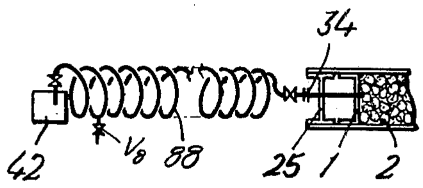

FIGS. 25 through 28 show certain arrangements permitting overflow of the mortar from the mould 1 for indicating completion of the pouring operation without using the indicating tank 38. In FIG. 25, the mould 1 is connected to the source of reduced pressure 42 through pipe 28 like the embodiments shown in FIGS. 23 and 24, but an inverted U-shaped section 85 having a substantial length is formed in pipe 28. Accordingly, after completion of the pouring operation, the mortar poured into the mould has to rise through the U-shaped section. By making transparent at least a portion of the U-shaped section or by disposing a mortar detector therein it is possible to correctly detect completion of the pouring operation. Yet the pressure in the mould can be suitably reduced by the source of reduced pressure 42. As shown in FIG. 26 such inverted U-shaped section 85 may be substituted by a bellows 86. Alternatively, as shown in FIG. 27, an additional mortar detector 87 may be added to the inverted U-shaped section. In the embodiment shown in FIG. 28, a coiled pipe 88 is connected between the mould 1 and the source of the reduced pressure 42. Where the coiled pipe 88 is made of transparent material completion of the pouring operation can be readily indicated.

In all embodiments described above the mould is positioned horizontally. However, in the embodiments shown in FIGS. 29 through 33, the mould is positioned vertically. In the manufacture of cast concrete articles which generally are in the form of flat plates, horizontal moulds are preferred because it is easy to load the coarse aggregate and or steel bars. However, where the cast concrete article is especially large, a large floor space is necessary. Especially when the products are manufactured on line production system, the apparatus as a whole become extremely complicated and bulky because it is necessary to successively move along the line not only the horizontally disposed mould but also the pouring tank, the indicating tank, the sources of pressure and reduced pressure, etc., associated with the mould.

Figure 30:
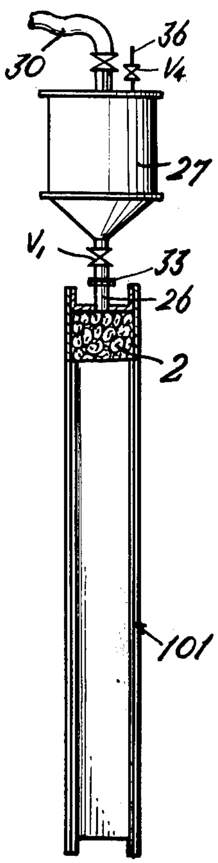
FIGS. 29 and 30 show front and side views, partially in section, of a modified overflow mechanisms for use in combination, with a vertical mould.
Figure 29:
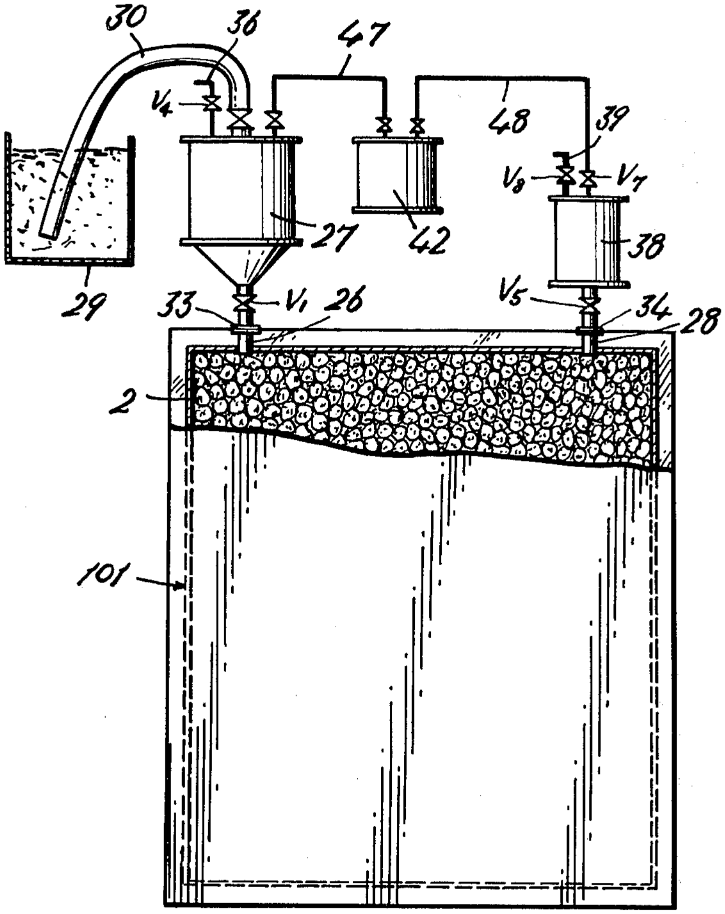

For the purpose of eliminating these defects it has already been practiced to position the mould in the vertical position by taking into consideration the thickness of the mould relative to the available space. Thus, as shown in FIGS. 29 and 30 the mould 101 is held in the vertical position and a closed pouring tank 27 and a closed indicating tank 38 similar to those described above are mounted near the opposite ends of the mould 101. These tanks are connected to a source of reduced pressure 42 through pipes 47 and 48, respectively and to the mould 101 respectively through pipes 26, 28 and couplings 33 and 34. Furthermore, the closed pouring tank 27 is connected to an open tank 29 via a pipe 30 in the same manner as in the embodiment shown in FIG. 3. Tanks 27 and 38 are also provided with vent pipes 36 and 39 including valves $V_4$ and $V_8$, respectively. When mortar is poured from upper into the vertical mould, the flow of the mortar is generally disturbed by the coarse aggregate and the steel rods disposed in the mould with the result that voids are formed beneath the coarse aggregate and the steel rods, thus impossible to provide perfect pouring. For this reason, it is advantageous to pour the mortar into the mould through the bottom thereof. However, where the height of the mould is large, it is necessary to pour the mortar against the large static pressure of the mortar in the mortar. When the mortar is poured in the mould from above, under a reduced pressure condition, it is possible to manufacture cast concrete articles having a height of several meters or more.

Figure 31:
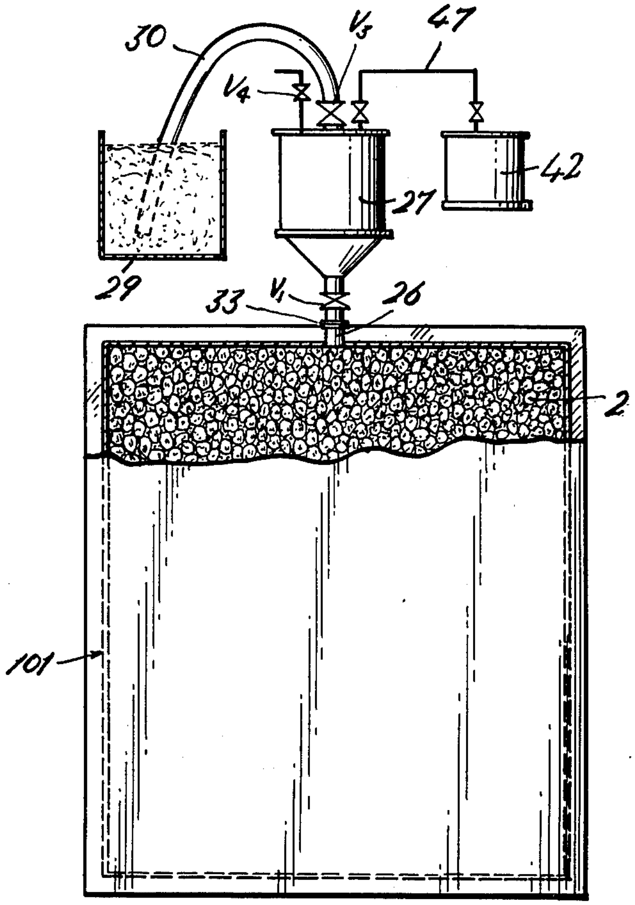
FIG. 31 shows a front view, partially in section, of another example of the moulding apparatus utilizing a vertical mould.

The apparatus shown in FIGS. 29 and 30 and used for the upper pouring system can be simplified as shown in FIG. 31. Thus, by mounting the closed pouring tank 27 above the mould it is possible to use the single tank 27 for pouring and indication, thus simplifying the construction. More particularly, with such simplified construction, after reducing the pressure in the tank 27 by connecting it to the source of reduced pressure, the valve $V_3$ is opened to pour the mortar into tank 27 from tank 29. Then valves **19*a* and $V_3$ are closed and valve $V_1$ is opened for pouring the mortar into the mould from tank 27. When the mould 1 is substantially filled and the pressure of the air remaining in the mould increases, the pressure in the mould can be reduced by connecting it to the source of reduced pressure 42 by opening valves 3***a* and 19*a*.

Although it was considered that when mortar is poured from upper into a vertical mould, the mortar can reach freely to the bottom of the mould without being resisted by the air in the mould. However, we have found that the poured mortar spreads about the pouring port in the upper portion of the mould and then descends downwardly as diagrammatically shown in FIG. 32, especially when the mould is loaded with coarse aggregate and or steel rods. As a result, there is a tendency that the remaining air is sealed in the bottom portion of the mould. By constructing a portion of the vertical mould from transparent material, it was noted that when the pressure in the upper portion of the mould is reduced as described above, the air sealed in the bottom portion rised upwardly through the poured mortar, thus increasing voids therein and degrading the product. Further, this hinders smooth pouring of the mortar.

Figure 32:
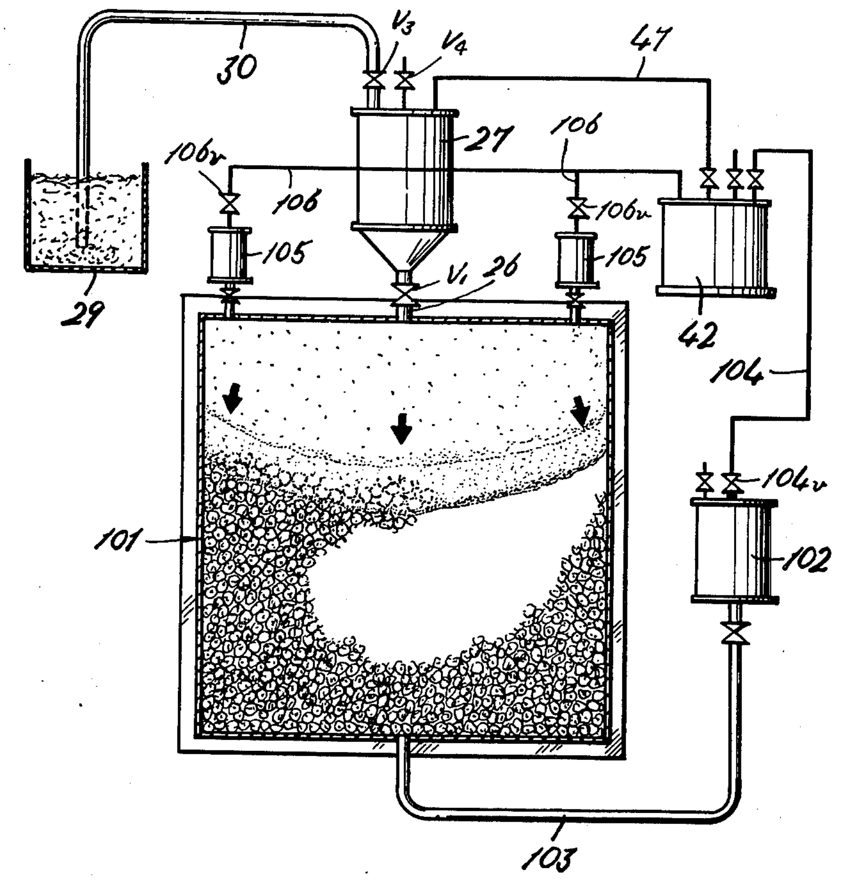
FIG. 32 shows a front view, partially in section, of a modification of the embodiment shown in FIG. 31.

To obviate this difficulty, in the modification shown in FIG. 32, an intermediate tank 102 is connected to the bottom of the mould 101 through a pipe 103, and the tank 102 is connected to the source of reduced pressure 42 through a pipe 104 including a valve 104*v*. Further, a pair of small closed tanks 105 are disposed on the opposite sides of the upper portion of the vertical mould 101. The tanks 105 are connected to the mould through valves 110 and to the source of reduced pressure 40 through a pipe 106 and valves 106*v*.

The operation of this modification is as follows. The coarse aggregate 2 is prepacked in the mould 1 and then valves $V_{17}$, 106*v*, 110 and 103*v* are opened to reduce the pressure in tank 27 and mould 101 by the source of reduced pressure 42, whereby the air in the interstices between the coarse aggregate 2 is removed. Then valve $V_3$ is opened to transfer the mortar in tank 29 into tank 27. Thereafter, valve $V_1$ is opened to pour the mortar in tank 27 into the mould 101. Since the pressure in the bottom portion of the mould is also reduced by the action of the source of reduced pressure 42 through pipes 103 and 104 and valve 103*v*, there is no fear of sealing the air in the bottom portion and hence rising of such sealed air. Although the mortar is poured while being dehydrated and deaerated, about 30 minutes after completion of the pouring operation, a certain amount of oozing water often collects in the upper portion of the mould. In other words, where the height of the poured mortar is relatively large, and where the area of the upper portion of poured mortar is relatively small, the oozed water may be separated notwithstanding of the pouring under a reduced pressure condition. Accordingly, for an interval of about 30 to 60 minutes after completion of the pouring operation, valves 106*v* and 110 associated with small tanks 105 are maintained in the opened state to reduce the pressure in the upper portion of the mould 101 by the action of the source of reduced pressure 42. By supplementing the mortar from tank 27 under these conditions, it is possible to obtain solid, that is void free products irrespective of the separation of the oozed water.

Figure 33:
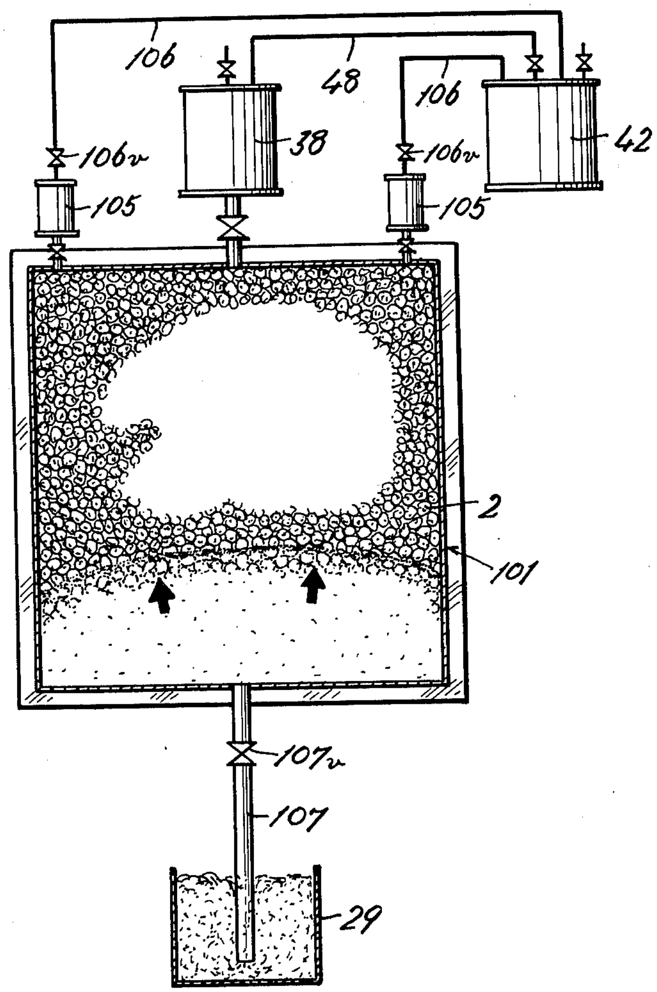
FIG. 33 is a diagram, partially in section of another embodiment of the present invention wherein the castable material is poured from under.

Since the method and apparatus utilizes a reduced pressure condition in the mould, it is also possible to obtain satisfactory products even when the mortar is poured into a vertical mould through the bottom thereof. FIG. 33 illustrates one example of such modification in which an open tank 29 containing mortar or other castable material 100 is connected to the bottom of a vertical mould through a pipe 107 including a valve 107*v*. An indicating tank 38 is connected to the upper plate of the mould 101 through a pipe 37 including a valve $V_5$ and two small tanks 105 are connected to the opposite sides of the upper plates through valves 110. The small tanks 105, and the indicating tanks 38 are also connected to a source of reduced pressure respectively through pipes 106, 48 and valves 106*v* and $V_{18}$. In operation, at first, valve 107*v* is closed and valve $V_5$ is opened to reduce the pressure in the vertical mould by the action of the source of reduced pressure 42. Then valve 107*v* is opened to pour the mortar 100 into the mould as shown by arrows by the pressure difference on the inside and outside of the mould. Since the head of the poured mortar in the mould gradually increases the pouring speed is gradually decreased thereby providing a type of the cushion effect. For this reason, it is possible to prevent creation of the closed condition of the mortar at the inlet end caused by the separation of water. When the level of the poured mortar reaches a predetermined level it is possible to continuously maintain the adequate pouring condition by further extending the pouring pipe 107 into the mould thereby decreasing the head difference or by increasing the vacuum in the mould. Moreover, as the mortar is poured into the bottom while exhausting the upper portion of the mould, it is possible to steadily pour the mortar without sealing the air in the bottom portion and hence forming voids caused by rising air as has been described in connection with the embodiment shown in FIG. 32.

The present invention is also useful where it is desired to manufacture products having openings or recesses. Where large structural members are prepared by precast technique it is essential to provide openings or recesses in the structural members for the purpose of ventilation or forming windows or passages. In such a case as the construction of the mould becomes complicated, it becomes considerably difficult to maintain the desired reduced pressure condition. Moreover, it is necessary to increase the mechanical strength of the mould to withstand against the pressure difference on the inside and outside of the mould. Moreover, handling of such large mould is extremely difficult.

Figure 34:
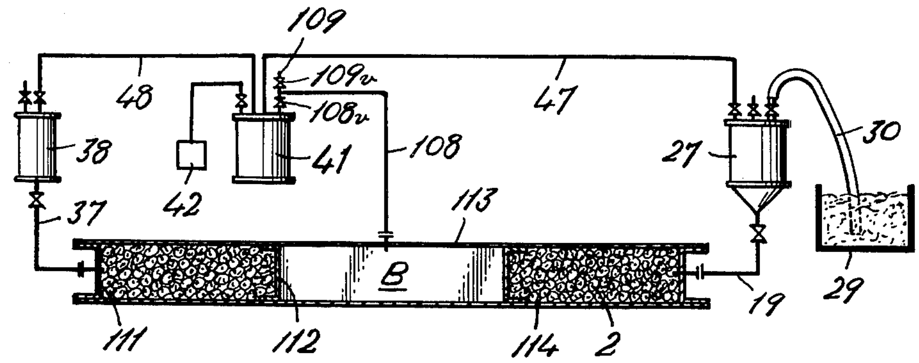
FIG. 34 is a diagrammatic representation, partially in section, of yet another modification of the present invention suitable for manufacturing a cast product having a central opening.
Figure 35:
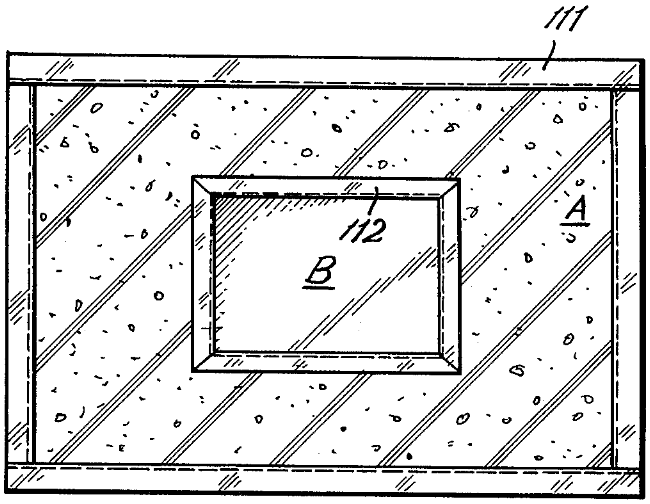
FIG. 35 is a upper plan view of the mould shown in FIG. 34 with its upper plate removed.
Figure 36:
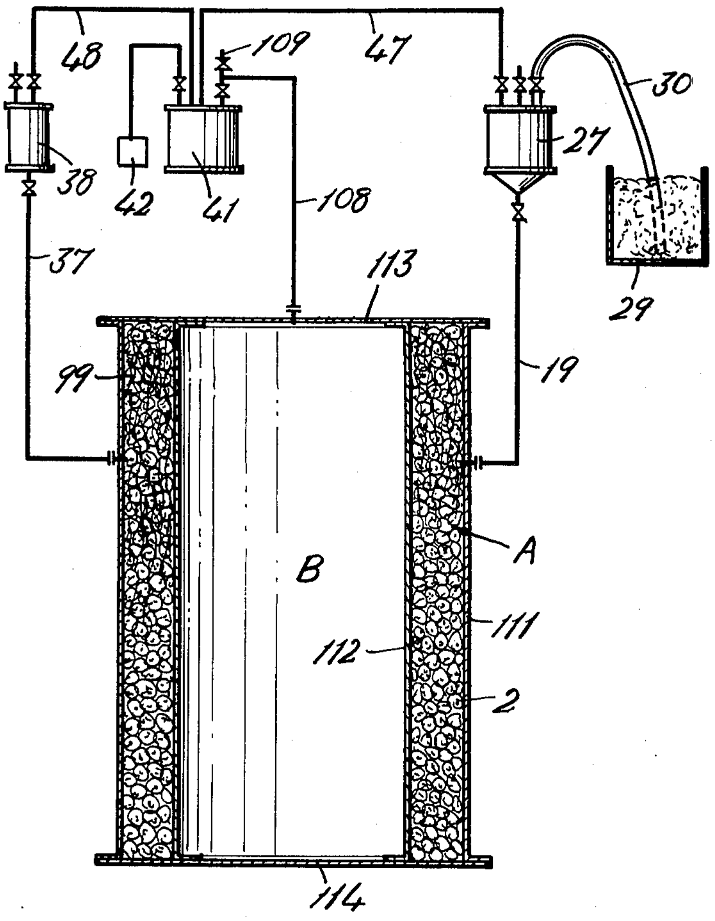
FIG. 36 is a diagrammatic representation, partially in section, of still another embodiment of the present invention which is suitable for manufacturing a cylindrical cast article.

FIGS. 34, 35 and 36 illustrate other embodiments of the present invention suitable for such application which enable to manufacture products requiring moulds of complicated construction under reduced pressure condition in the same manner as simple products not including openings or recesses. These embodiments also enable to maintain the pressure in the openings or recesses at the same pressure in the solid moulded portion.

The mould shown in FIG. 34 comprises an outer rectangular frame 111, and an inner rectangular frame 112 provided with an opening corresponding to the opening or recess B in the cast article A. These outer and inner frames are clamped between a upper plate 113 and a bottom plate 114 for defining a chamber adapted to accommodate coarse aggregate 2. The chamber for moulding the product is connected to the pouring tank 27 through a pipe including a valve $V_1$. The tank 27 is connected to a source of reduced pressure 42 shown as a vacuum pump through a pipe 47 and a tank 41. An overflow or indicating tank 38 is also connected to the mould chamber through a pipe 37 including a coupling 34 and a valve $V_6$. The opening B is also connected to vacuum tank 41 through pipe 108 including valve 108*v*. The pipe 108 is also provided with a vent valve 109*v*.

In operation after packing coarse aggregate in the space corresponding to the cast product A, valves $V_7$, $V_{16}$ and 108*v* are opened to decrease the pressure in the spaces A and B and tank 27. Then valve $V_3$ is opened to transfer the mortar into tank 27 from tank 29. The mortar transferred into tank 27 is spreaded and removed of its excess water and entrained air. Thereafter valve $V_1$ is opened to pour the mortar into the mould. By continuously supplementing mortar into tank 29 it is possible to continuous by cast the product. Upon completion of the pouring operation, the mortar enters into the indicating tank 38 via pipe 37. When such overflow of the mortar is detected by visual observation or by means of a suitable detector, valve $V_1$ is closed to terminate the pouring operation thereby gradually increasing the pressure in tanks 27 and 38 until finally atmospheric pressure is reached. Accordingly, the mortar is poured into the mould under atmospheric pressure thus producing a more compact and void free product. At this time the vent valve 209 is also opened so as to make the pressure in area B to be always equal to the pressure in area A. This eliminates the necessity of providing a special sealing member to the inner frame 112 and of imparting a sufficient strength to the inner frame to withstand against a large pressure difference. Moreover, after completion of the moulding operation, it is possible to readily remove the top or bottom plate 113 or 114 without being interfered by the pressure difference on the inside and outside of the mould.

FIG. 36 shows an embodiment similar to that shown in FIG. 34 except that the cast product A is a tubular article. Although the volume of the opening B is increased greatly, the same advantageous features can be provided. Where it is desired to obtain thin walled products such as cylinders, the coarse aggregate 2 may be substituted by fibers of metal or glass. In addition, according to this embodiment it is possible to obtain dense tubular products without using centrifugal moulding operation which accompanies noise.

Figure 37:
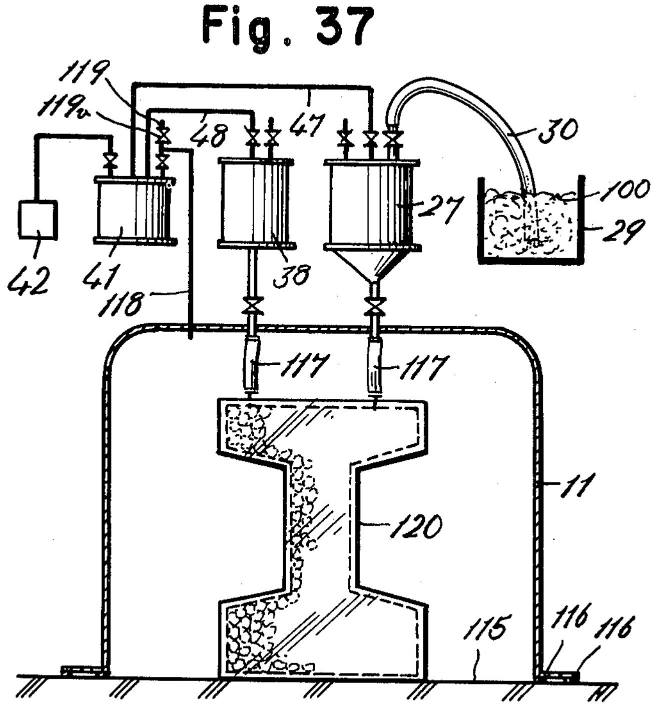
FIG. 37 is a diagrammatic representation of the casting apparatus suitable for casting articles having a complicated cross-sectional configuration.
Figure 38:
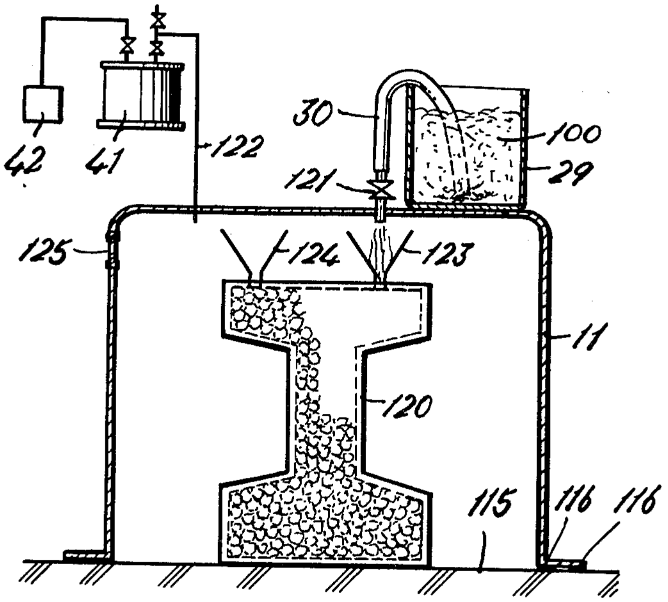
FIG. 38 is a similar view showing a modification of the embodiment shown in FIG. 37.

As has been described above, in connection with the embodiment shown in FIG. 1, in accordance with the present invention it is possible to cast while the mould 1 is contained in the reduced pressure chamber 11. Utilization of such reduced pressure chamber is especially advantageous where articles or complicated construction are to be manufactured. FIGS. 37 and 38 illustrate such application. In the embodiment shown in FIG. 37, a hood shaped reduced pressure chamber 11 is mounted on a base plate 115. Preferably a sealing member 116 is interposed between the chamber 11 and the base plate 115. The mould 120 disposed in the chamber 11 is illustrated to have a cross-section of a rail. However, it will be clear that the construction of the mould is not limited to any particular configuration, and that it may take any irregular and complicated construction. Any conventional mould of the composite construction may also be used, and no air tight seal is necessary although the pressure in the mould is reduced below the atmospheric pressure. A closed pouring tank 27, preferably provided with means for spreading the mortar as described above, and an open tank 29 are provided for pouring the mortar 100 in tank 29 into the mould 120 through pipe 30, valve $V_3$, tank 27, valve $V_1$ and pipe 117. An overflow or indicating tank 38 is also connected to the mould 120 through a pipe 117 including a valve $V_5$. Tanks 27 and 38 are connected to a vacuum pump 42, or a source of reduced pressure and a vacuum tank 41 through pipes 47 and 48. As before, tanks 27, 38 and 41 are provided with vent valves 36, 39 and 119*v*. Further, the vacuum tank 41 is connected to the mould 120 through a pipe 118. Of course the reduced pressure chamber 11 should have sufficient strength to withstand the pressure difference between its inside and outside.

The apparatus shown in FIG. 37 operates as follows. The vacuum tank 41 is connected to the reduced pressure chamber 11 through pipes 47, 48 and 118 to reduce the pressure in the reduced pressure chamber and the mould 120. When coarse aggregate 2 is prepacked in the mould 120 the air in the interstices in the coarse aggregate can be removed. Then the pressure in the tanks 27 and 38 is also reduced by connecting them to the vacuum tank 41. Thereafter valve $V_3$ is opened to introduce the mortar 100 into tank 27 from tank 29. The mortar admitted into tank 27 is spread in a manner described in connection with FIG. 15 for removing excess water and entrained air. Then, valve $V_1$ is opened to pour the mortar into mould 120. Thereafter, the operation proceeds in the same manner as described above. After the pouring and compacting of the cast mortar have been completed, connections 117 are removed from the cast mould and then connected to the next empty mould.

FIG. 38 shows still another embodiment of the present invention which is simpler than that shown in FIG. 37. In this embodiment, the closed pouring tank 27, overflow tank 38 and connections between the reduced pressure chamber 11 and the mould 120 are omitted. Thus, the open tank 29 and the vacuum tank 41 exhausted by vacuum pump 42 are connected directly to the reduced pressure chamber 11, and the pipe 30 including valve 121 and extending from open tank 29 opens directly in the upper plate of the reduced pressure chamber 11 and the pipe 122 leading from the vacuum tank 41 is also connected to a suitable portion of the reduced pressure chamber 11. The mould 120 is provided with two funnels 123 and 124 at its upper surface. One of the funnels 123 is positioned beneath the opening of pipe 30 whereas the other funnel 124 is made of transparent material and a window 125 is provided for the side wall of the chamber 11 for supervising overflow of the mortar which occurs when the pouring operation of the mortar 100 has been completed.

In operation, while valve 121 is being closed, the pressure in chamber 11 is reduced by connecting it to the vacuum chamber 41. Then valve 121 is opened to pour the mortar 100 in tank 29 into the mould 120 through the funnel 123. Completion of the pouring operation can be detected by viewing overflow of the mortar in funnel 124 through the window 125. Then valve 121 is closed and vent valve 119*v* is opened to compact the cast mortar by the atmospheric pressure.

Figure 39:
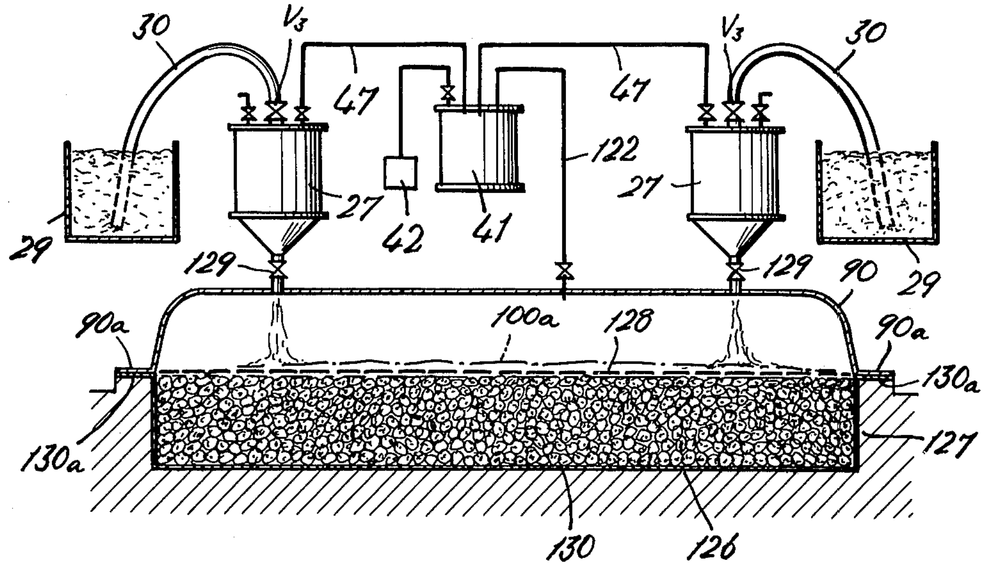
FIG. 39 shows another embodiment of the present invention suitable for constructing a foundation of a structure or road.

The invention can also be used in connection with a mould which is not made especially rigid. FIG. 39 shows such embodiment in which the mould 126 is constituted by a recess formed in a base 127 and a hood 90 covering the recess. Two closed pouring tanks 27 each connected to open tank 29 containing mortar 100, and a vacuum tank 41 evacuated by a vacuum pump 42 are provided to act in the same manner as the embodiment shown in FIG. 37. The number of the pouring tank 27 is not limited to two but may be one, three or more than three depending upon the size of the cast product. Generally speaking, the area of the mould that can be efficiently poured with mortar from one pouring tank is approximately 10 $m^2$. The mould 126 may be a portion of a road or the basement of a building. The bottom surface of the mould 126 is covered by an air impervious layer 130 such as an artificial resin film and the upper peripheral edge 130*a* of the film is overlayed by the bottom flange 90*a* of the hood 90. The mould 126 is packed with coarse aggregate 2 and or steel bars not shown. The coarse aggregate 2 is covered by a metal wire net 128 or the like for preventing floating up or movement of the coarse aggregate.

The operation of the embodiment is generally the same as that of the previous embodiment. However, in this case it is advantageous to reduce the pressure in the hood 90 to 0.3 kg/cm² or less. In some cases, it is possible to deposit a portion of the mortar on the coarse aggregate 2 to form an overflow layer 100*a* and then the pressure in the hood 90 is reduced to cause the deposited layer to impregnate the coarse aggregate 2. Thereafter, valve 129 is opened to add the remaining portion of the mortar onto the impregnated coarse aggregate. According to this method, since the mortar is spread widely on the coarse aggregate, excess water and entrained air can be removed efficiently. Since it is possible to continuously supplement mortar into pouring tanks 27 by opening the valves $V_3$, it is possible to cast extremely large building foundations or load in a sealed chamber and under reduced pressure. After pouring, by breaking the vacuum in the hood 90 it is possible to compact the cast product thus obtaining dense and void free products. Although completely closed rigid cubic mould is not used it is still possible to obtain well defined product because the floating up and movement of the coarse aggregate are prevented by the member 128.

Figure 40:
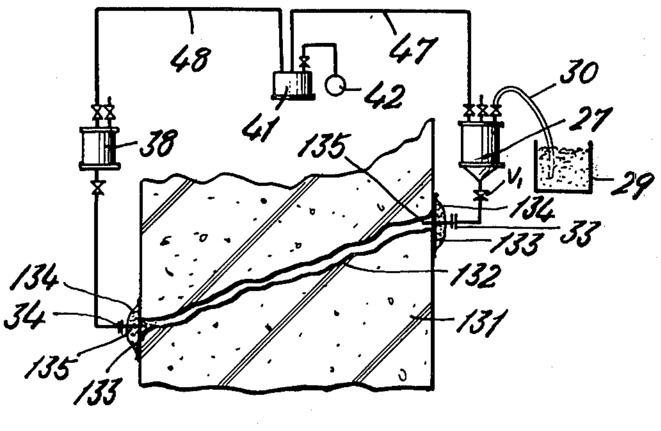
FIG. 40 is a diagrammatic representation of a modification of the present invention utilized to repair cracks formed in a concrete structure.

FIG. 40 illustrates more specific and advantageous embodiment of the present invention which is useful to repair cracks formed in a concrete structure. Cracks are ofter formed in a concrete building or the like due to deformation of the foundation or temperature variation, and such crack enlarges with time, thus causing leakage of rain water or in the worst case rupture of the building. Accordingly, it is necessary to promptly repair the crack. However, in the past no effective method of repairing the crack has been available. More particulary it is common to apply a cement paste or mortar to cracks appearing on the surface of the concrete structure, but such method can not repair the cracks formed in the inner portion of the concrete structure, and the cement paste or mortar applied only to the surface cracks will soon be broken. To obviate this disadvantage, it has recently been proposed to inject epoxide resin or the like into the cracks. Even with this method it is impossible to completely fill small and deep cracks of complicated construction. Such resin requires a special and expensive solvent. Further, as the resin has different physical and chemical characteristics from those of concrete, satisfactory repair can not be expected.

As has been pointed out before, a crack 132 visible on the surface of a concrete structure 131 generally extends into deep portions of the structure, and at deep portions, the crack has narrow width and complicated configuration. In the embodiment shown in FIG. 40, a cover plate 133 having an area sufficient to cover the crack is applied. Where the crack is present in only one surface of the concrete structure only one cover plate is used whereas when the crack extends between opposite surfaces of the structure at least two cover plates should be used. The cover plate is secured to the surface of the structure through an air tight sealing member 134, which may be a rubber tube, an adhesive tape or putty. The inside of the cover plate 133 is communicated with pouring tank 27 through valve $V_1$ and the pouring tank 27 is connected to a vacuum tank 41 through pipe 47 and to the open tank 29 (which contains mortar) through a pipe 30. As before, an overflow or indicating tank 38 is connected to the cover plate 133. The overflow tank 38 is positioned at a level higher than a crack at the highest level. The overflow tank 38 is provided with a vent pipe 39 and connected to the vacuum tank 41. In operation, the inside of the cover plate 133 is connected to the source of reduced pressure through the vacuum tank 41 to remove air in the gap 132. Thereafter valve $V_1$ is opened to inject mortar or paste into every portion of the gap 133. After injection, atmospheric air is admitted into the tanks 27 and 38 thus applying atmospheric pressure to the mortar or paste thus compacting the same. Thus, this embodiment enables to completely fill the mortar or paste into every detail of the gap. Such repair has been impossible by any prior art apparatus or method.

Figure 41:
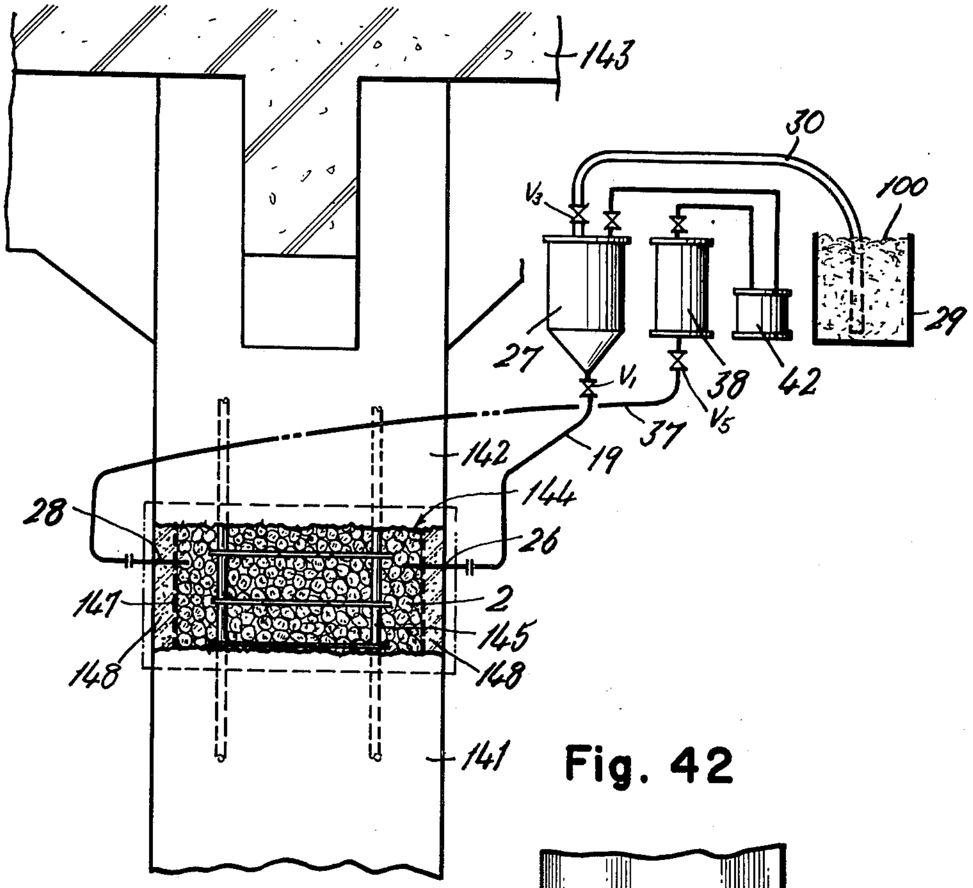
FIGS. 41 through 44 are diagrams showing applications of the present invention for jointing concrete or steel pillars to other concrete pillar or foundation.

FIG. 41 shows another embodiment of the present invention which is suitable for field application and does not require to use any special mould. The embodiments shown in FIG. 41 and succeeding figures are suitable to connect together a pair of concrete structures or blocks by moulding mortar between them. These embodiments are suitable to interconnect different portions of a concrete structure, or to fill a gap between the base of a machine and its foundation thus forming a rigid supporting structure or a force transmitting structure. More particularly, when constructing a concrete structure, a building for example, it is usual to fabricate also a subground structure. In such a case, instead of digging a deep opening having a depth equal to the height of several stories, in some cases concurrently with the fabrication of the structure above the ground surface, the ground is gradually dug downwardly to successively fabricate pillars, beams or floors from the ground surface in the downward direction. In such method of fabrication, it is difficult to perfectly fill concrete in all corners between the upper portion of a subsequently fabricated pillar and the bottom portion of a previously fabricated pillar. Further, as the concrete is set, oozing water collects on the upper portion of the subsequently fabricated pillar and such later fabricated pillar tends to sink. The previously fabricated upper pillar dries and shrinks so that it is inevitable that a substantial gap forms between the upper and lower pillars. For this reason, it is usual to suitably space apart the upper and lower pillars and fill concrete in the gap after removing irregularities at the opposing surfaces. However, there has been no satisfactory method of connecting upper and lower concrete pillars by filling concrete between them, so that in many cases the operator must fill the gap with concrete by a hand tool. Of course this method can not be used to interconnect two pillars with a sufficiently strong joint. More particularly, although it is possible to fill the outer portion of the gap, the inner portions will not be completely filled with concrete. In concrete buildings it is essential to strongly join the upper structure to the underground structure, for the purpose of providing desired strength, rigidity and safeness.

According to the embodiment of the present invention shown in FIG. 41, a gap 144 is formed between the upper portion of a foundation or a pillar 141 supported thereby and the supporting member 142 for a upper structure 143. Coarse aggregate 2 is filled in the gap 144 around steel bars or beams 145. The gap 144 is surrounded by a porous cover 147, such as an expanded metal, which may be applied in position by merely wrapping it about the gap 144 and the coarse aggregate contained therein. The cover is not required to be air tight or adhesive. Thereafter a relatively thin coating 148 of concrete is formed to seal the gap 144. Since the coating 148 is lined with the expanded metal it is firmly supported by the pillars. The interior of the concrete coating 148 is connected to a closed pouring tank 27 through a pipe 19 and a valve $V_1$ and to an overflow or indicating tank 38 through a pipe 37 and a valve $V_5$. Tanks 27 and 38 are connected to a source of reduced pressure through valves and the tank 150 is also connected to an open tank 29 containing mortar through a valve $V_3$ and a pipe 30 in the same manner as in the previous embodiments. Accordingly, this embodiment also operates in the same manner. More particularly, at first valves $V_1$, $V_5$ and $V_3$ are opened to reduce the pressure in the gap 144 by the operation of the source of reduced pressure 42. Thereafter valve $V_3$ is opened to transfer the mortar contained in the tank 29 into tank 27. The mortar is subjected to the action of the reduced pressure to remove excess water and entrained air and then poured into the gap 144. When the gap 144 is filled with mortar, a portion thereof overflows into the indicating tank 38 thus informing the operator that the pouring operation has completed. Thereafter valve $V_3$ is closed and the pressure in tanks 27 and 38 is increased gradually to atmospheric pressure so as to compact the poured mortar. According to this embodiment, it is possible to pour the mortar in all spaces in the gap and the concrete joint thus formed has sufficient mechanical strength, and is dense and void free.

Figure 42:
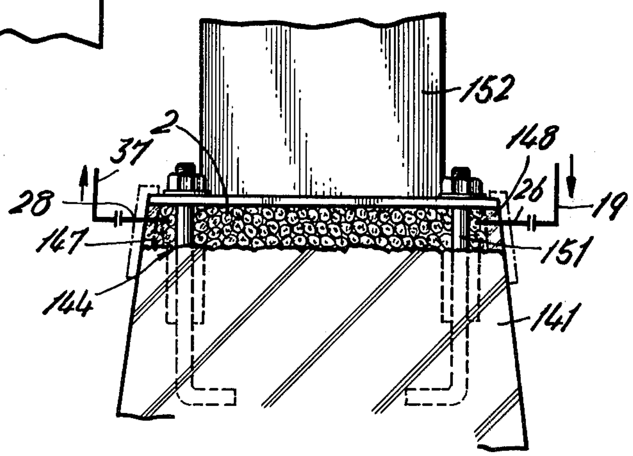

The method described in connection with FIG. 41 is also applicable where one of the members to be joined comprises a metal member. FIG. 42 illustrates such application. Thus, a structure 152 such as a steel pillar or a supporting leg of a machine, not shown, is mounted on a support or foundation 141 with a suitable gap 144 therebetween. The structure 152 is secured to the foundation by anchor bolts 151. In the same manner as in FIG. 41, the gap is packed with coarse aggregate 2 which is surrounded by perforated cover 147. A coating of concrete or mortar 148 is applied to cover the perforated cover 147. Mortar is poured into the gap 144 in the same manner as has been described in connection with the embodiment shown in FIG. 41.

Figure 43:
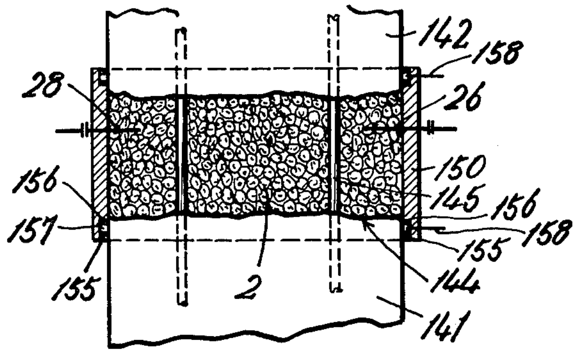

FIG. 43 shows a modified concrete joints. Although in the embodiments shown in FIGS. 41 and 42, no special mould is used, it takes a certain curing time for setting the concrete or mortar cover 148. To obviate this defect, according to the embodiment shown in FIG. 43, the gap 144 between the upper structure 142 and the lower structure 141 is surrounded by plates 150 of metal or wood to form a mould. An air sealing member 155 is interposed between the upper portion of the plates 150 and the upper structure 142, whereas a mortar sealing member 156 is interposed between the lower portion of the plates 150 and the lower structure 141. A pipe 33 leading to the closed pouring tank 27 (see FIG. 41) and a pipe 34 leading to the overflow tank 38 are connected to the space within the plates 150. By the same method as has been described in connection with FIGS. 41 and 52, the mortar is poured into the gap 144.

Figure 44:
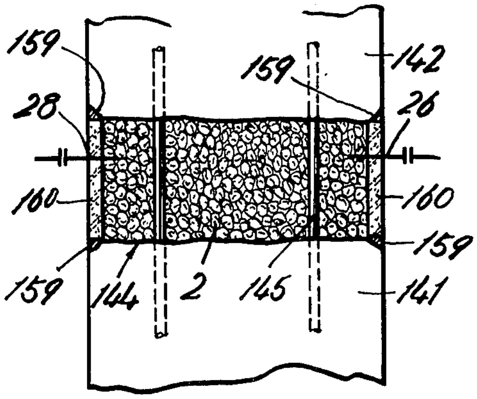

The embodiment shown in FIG. 44 is identical to that shown in FIG. 43 except that mould plates 160 of steel or plastic are interposed between the upper structure 142 and the lower structure 141 in flush with their outer surfaces. At the interfaces between the mould plates 160 and the upper and lower structures are provided plastic filling members 159 which may comprise putty or the like. As the filling members 159 have a wedge shaped cross-sectional configuration, when the pressure in the gap 144 is reduced the filling members are pressed inwardly by the atmospheric pressure thus increasing the sealing effect.

As the mould plates 160 are secured to be flush it is possible to manufacture them beforehand in a factory by metal or concrete, thus enabling to form the concrete joint in a short time.

Figure 45:
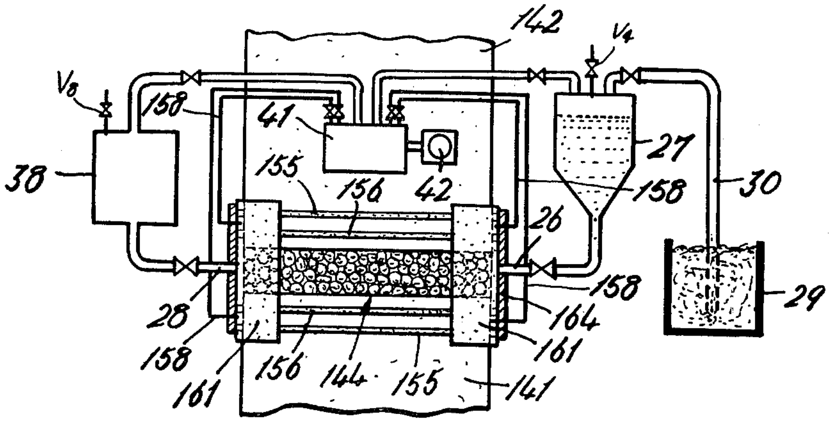
FIG. 45 is a another diagrammatic side view of the invention for jointing between concrete pillars suitable for the field works.
Figure 46:
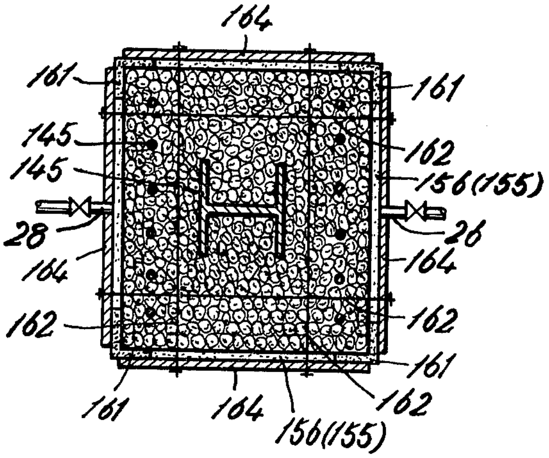
FIG. 46 is a cross section at the intermediate of FIG. 45.

FIGS. 45 and 46 show a modification of the embodiments shown in FIG. 43. However the embodiment shown in FIGS. 45 and 46 are improved to be more suitable for practical application. More particularly, in the embodiment shown in FIG. 43 it is necessary to form the mould constituted by plates as a split type so that it is necessary to provide a suitable sealing member between split halves. In the embodiment shown in FIGS. 45 and 46, the mould plates are divided into a plurality of unit plates 164 of the same number as the number of side faces of the lower structure 141. Sealing members similar to sealing members 155 and 156 shown in FIG. 43 are provided between the upper and lower ends of respective unit plates 150 and the upper and lower structure 142 and 141. Angle corner members 161 made of rubber or soft synthetic resin are provided to cover corners between adjacent longitudinal edges of the unit plates 164. Opposing unit plates 164 are connected together by tie bars 162 thus forming a closed mould. Although tie bars 162 remain in the cast concrete joint, as they are used merely to assemble the closed mould, the tie bars may have a relatively small diameter. The operation and arrangement of the pouring tank 27, indicating tank 38 and the source of reduced pressure are the same as has been described with reference to FIG. 41.

To have better understanding of the present invention some examples are given in the following.

EXAMPLE 1

Coarse aggregate consisting of crushed stone having a grain size of about 10 to 20 mm (specific gravity 2.6) was packed in the mould 1 shown in FIG. 1 and then the perforated plate 3 was placed on the coarse aggregate 2. The pressure in the chamber 11 was reduced to about 0.1 $Kg/cm^2$ by the operation of the pressure reducing mechanism 6. Cement mortar consisting of a mixture of 91 $Kg/m^3$ of cement, 791 $Kg/m^3$ of sand, 356 $Kg/m^3$ of water, and 15.8 $l/m^3$ of a dispersion agent and having a flow rate of 17.8/sec. and a specific weight of 1.962 Kg/l was poured in hopper 5. Then the valve 7 was opened to pour the mortar into the mould 1. Pouring was continued for about 2 to 3 seconds, and the valve 7 was closed when the level of the mortar rose 10 mm above the perforated plate 3. Then valve 10 was opened to restore the pressure in the reduced pressure chamber to the atmospheric pressure for forcing the mortar above the perforated plate 3 into the mould 1.

The case concrete block was subjected to a curing treatment for 7 days at a temperature of 20° C in wet air. The resulting product had a compression strength of 292 $Kg/cm^2$ whereas a concrete block manufactured by the conventional prepacking process utilizing the same coarse aggregate and the same curing treatment had a compression strength of 252 Kg/$cm^2$ showing substantial increase in the compression strength. Further, the surface appearance of the product was excellent.

EXAMPLE 2

Apparatus identical to that used in Example 1 was used. Light coarse aggregate produced at Haruna and having a grain size of less than 20 mm and a specific gravity of about 0.8 was used. Mortar consisting of 960 Kg/$m^3$ of cement, 78 Kg/$m^3$ of light fine aggregate having a particle size of less than 1 mm, 533 Kg/$m^3$ of water, and 4.8 Kg/$m^3$ of a dispersion agent and having a W/C ratio of 5.7% flow rate of 16.0/sec. and a specific weight of 1.58 Kg/l was poured into the mould under a reduced pressure of 0.1 Kg/$cm^2$ until the level of the mortar reached a level about 30 mm above the perforated plate 3. Thereafter valve 10 was opened to push back the mortar to the space beneath the perforated plate thus producing a dense concrete block. After steam curing for 8 hours at a temperature of 60° C, compression strength of 80 Kg/$cm^2$ was obtained. On the other hand the concrete block prepared by the conventional prepacking process and utilizing the same light coarse aggregate and the same curing condition as in Example 1 showed a specific weight of 1.35 and a compression strength of 43 Kg/$cm^2$. This shows that the compression strength was increased greatly.

EXAMPLE 3

The method of Examples 1 and 2 was repeated except that a light coarse aggregate produced at Oshima and having a grain size of from 10 to 20 mm (specific gravity 1.6) was used. In this Example mortar was rose 20 mm above the perforated plate 3. The resulting concrete block had a specific weight of 1.91 Kg/l and a compression strength of 228 Kg/$cm^2$. On the contrary, a concrete block manufactured by the conventional prepack method and by utilizing the same material and curing condition as this example showed a specific weight of 1.743 Kg/l and a compression strength of 186 Kg/$cm^2$.

EXAMPLE 4

The apparatus shown in FIG. 2 was used and the mould had dimensions of 50 × 650 × 650 cm. One side of the mould 1 was made of a transparent plate for observing the manner of rising the mortar during pouring. The same coarse aggregate and mortar as in Example 2 were used. Only a single pouring pipe 4 was used. During pouring the pressure in the mould 1 was reduced to 0.1 Kg/$cm^2$ and the pressure in the indicating tank 13 was also reduced slightly. It was noted that the mortar rises with its level always maintained horizontal. The time required for the pouring operation was about 20 seconds.

When the mortar is cast by the conventional method it is necessary to use two or more pouring tubes and a pouring time of 2 to 3 minutes. On the other hand, according to this invention it is possible to pour in shorter time with a single pouring tube because the pressure in the mould is reduced at the time of pouring.

When vibration is imparted to the mould for 1 to two seconds after pouring and while the mould is still subjected to reduced pressure, it was noted that air voids along the inner surface of the mould were completely eliminated. It will thus be noted that the vibration imparted not only enhances impregnation of the mortar into the structure of the coarse aggregate but also improves the surface characteristic of the product.

When subjected to the same curing treatment as in Example 2, the product had a specific weight of 1.41 Kg/l, and a compression strength of 81.5 Kg/$cm^2$ which is to be compared with 43.5 Kg/$cm^2$ of the product manufactured by the conventional method.

The surface condition of the product was also inspected. The product of the conventional method contained 3 to 5 voids or recesses of 2 to 10 mm per 100 $cm^2$ of the surface, but in the product of the present invention the number and size of such voids were reduced greatly.

EXAMPLE 5

In this example, the apparatus shown in FIG. 3 was used. A layer of mortar having the same composition as the mortar moulded subsequently (to be described later) was formed in a closed mould having dimensions of 1400 × 600 × 150 mm, and then coarse aggregate comprising No. 5 crushed stone (having a diameter of 13 to 20 mm and a specific gravity of 2.6 was packed in the mould. The volume of the interstices in the coarse aggregate was 55.4 l. Thereafter the upper bed was mounted on the mould. Mortar was prepared by admixing 1 part of cement, 1 part of sand having a particle size of less than 2.5 mm, 0.445 part of water, 0.25% based on the volume of the cement of a dispersion agent and 0.01% of aluminum powder. The mortar had a flow rate of 26 seconds. The mortar in the open tank 29 was transferred into a closed pouring tank 27 made of transparent acrylic resin. The pressure in the tank 27 and the mould was reduced to −70 cm Hg and then pouring of the mortar was commenced. Thereafter, the pressure in the tank 27 was gradually decreased to −60 cm Hg, then to −55 cm Hg, and when the pouring operation is completed, that is when the mortar overflowed into tank 38, the pressure in the tanks 27 and 38 was restored to normal atmospheric pressure. When a pouring tube having an inner diameter of 2.5 cm was used, the time required for pouring was 5 minutes and 45 seconds. One hour after pouring, the cast mortar was cured by increasing the temperature from 7° C at a rate of 20° C/hour and maintained at a temperature of 60° C for 4 hours. Thereafter the cured product was removed from the mould. Immediately after such removal, the product had a compression strength of 183 Kg/$cm^2$ which was increased to 293 Kg/$cm^2$ after one week and to 380.5 Kg/$cm^2$ after 4 weeks. The surface condition was flat like a mirror thus requiring no surface finishing. A cylindrical sample was cut from the product and its internal structure was examined. It was noted that the mortar was completely filled in the coarse aggregate thus providing dense and void free structure.

EXAMPLE 6

Again the apparatus shown in FIG. 3 was used. Mortar similar to that used in Example 5 was prepared except that aluminum powder was not used. The mortar had a flow rate of 24.6 seconds. This mortar was poured into the mould 1 and the closed tank 27 while the pressure in this was reduced to −65 cm Hg. Pouring was continued while the pressure in tank 27 was stepwisely reduced to −50 cm Hg and −45 cm Hg. When this mortar appeared in the indicating tank 38, pouring of the mortar was terminated and the pressure in the tank 27 was restored to the atmospheric pressure. The time required for pouring was 4 minutes and 5 seconds.

Immediately after pouring the concrete block was cured. Thus the temperature was elevated at a rate of 20° C per hour and maintained at 60° C for 4 hours. When removed from the mould the product showed a compression strength of 175/cm$^2$ which was increased to 227 kg/cm$^2$ after 7 days and to 323 kg/cm$^2$ after 4 weeks. The surface appearance and inside structure were similar to those of Example 5.

EXAMPLE 7

In this Example, the apparatus shown in FIG. 3 was used. Crushed stone No. 4 having a grain size of 20 to 30 mm and a specific gravity of 2.6 was used as the coarse aggregate 2 packed in the mould 1 to leave an unoccupied space of 52.2 l in the mould. The mortar used comprised 1 part of cement, 1.5 parts of sand, 0.60 part of water and 1.0% of a dehydrating agent which was used to provide the desired strength as far as possible, and the mortar had a flow speed of 34 seconds. After reducing the pressure in the mould 1 20 - 70 cm Hg and the pressure in the closed tank 27 to −65 cm Hg, pouring of the mortar was commenced. Pouring was continued while the pressure in tank 27 was increased to −55 cm Hg then to −35 cm Hg and when the mortar appeared in the indicating tank 38, pouring was terminated and the pressure in tank 27 was increased to the atmospheric pressure. The total time required for the pouring was 3 minutes and 8 seconds. Then the cast block was subjected to the same curing treatment as in Example 6 and then removed from the mould to obtain product. The surface appearance of the product was the same as that of previous examples, and only few small voids were noted inside the product. These results show that the product of this example has much excellent properties than a product prepared by the conventional prepack process wherein vibration was applied to the mould, and the mortar was poured under a pressure of about 3 Kg/cm$^2$ through a plurality of parallel pouring pipes spaced each other by 20 cm.

EXAMPLE 8

Again the apparatus shown in FIG. 3 was used. The light coarse aggregate having a grain size of larger than 15 mm and a specific gravity of 1.2, which is the same as that used in Example 4, was used. The composition of the mortar was 1 part (all in weight ratio) of cement, 0.1 part of perlite, 0.575 part of water and 0.05 part of dehydrating agent. The pouring of the mortar was started with the pressure in the mould 1 and the closed tank 27 reduced as described in Example 7. Then the pouring was continued while the pressure in the closed tank 27 was increased to −50 cm Hg and then −30 cm Hg. The pouring was completed within a period of about 4 minutes. Thereafter the cast block was subjected to a steam curing treatment for about 4 hours to obtain a product. The compression strength of the product was about 80 Kg/cm$^2$ immediately after removal from the mould, and increased to about 110 Kg/cm$^2$ after 7 days and about 140 Kg/cm$^2$ after 4 weeks. It was found that the mortar was impregnated into all interstices of the light coarse aggregate.

EXAMPLE 9

Again the apparatus shown in FIG. 3 was used. The same coarse aggregate and mortar as those disclosed in Example 6 were used and the mortar was poured under the same conditions as in Example 6. Then the pressure in tanks 27 and 28 was increased to about 5 Kg/cm$^2$ by the source of pressure 43, thus completing the pouring operation. The cast block was subjected to the same curing treatment as in Example 6 and then removed from the mould. The compression strength of the product immediately after removal from the mould was 228 Kg/cm$^2$ which was increased to about 373 Kg/cm$^2$ after 7 days and to 466 Kg/cm$^2$ after 4 weeks which is much higher than that shown in Example 6.

EXAMPLE 10

This example relates to the repair of cracks shown in FIG. 40. The crack 132 had a length of 188 cm on one surface of a concrete wall and obliquely extended toward the opposite surface. Plates 133 having a length of 2 meters were applied to cover the crack and the peripheries of the plates were air tightly sealed by means of an adhesive tape. The pressure in the crack was reduced to 0.15 Kg/cm$^2$by means of the vacuum tank 41 and then a cement paste prepared by admixing 5 parts of Portland cement and 2 parts of water was poured into the crack from open tank 29 through closed tank 27. When the poured paste appeared in the indicating tank 38 pouring of the paste was terminated. Then the valves $V_4$ and $V_8$ in the vent pipes 36 and 39 were opened gradually to restore the pressure in tanks 27 and 38 to the atmospheric pressure. After setting the poured cement paste the plates 133 were removed. Seven (7) days after repair an opening was drilled in the direction of the crack to inspect the manner of filling the crack and it was found that the cement paste had impregnated all portions of the crack.

EXAMPLE 11

A crack having a maximum width of 11 mm and extended through the thickness of a concrete structure 131 was air tightly sealed by applying cement mortar to the surface portion the crack and then curing. The pressure in the crack was reduced to 0.12 Kg/cm$^2$ and then mortar prepared by admixing 5 parts of cement, 5 parts of sand and 2.5 parts of water was poured into the crack. Where the crack had a length of 200 cm and a depth of 350 mm, the time required for the pouring was about 1 minute. Thereafter, the pressure in the crack was increased in the same manner as in Example 10 and the layer of the cement mortar firstly applied was removed.

Ten (10) days after an opening was drilled through the concrete structure in the direction of the crack and it was found that the crack was completely filled.

EXAMPLE 12

This example relates to the embodiment shown in FIG. 41.

The foundation pillar 141 had a square cross-sectional configuration in which the length of one side was 1200 mm. The coarse aggregate 2 used was No. 4 crushed stone having a specific gravity of 2.6, and the gap 144 was surrounded by an expanded metal 147. A mortar layer 148 was applied to the outside of the expanded metal 147 to a thickness of 20 mm. After setting the mortar layer, the pressure in the gap 144 was reduced to 0.2 Kg/cm$^2$, and mortar prepared by admixing 100 parts of cement, 100 parts of sand and 45 parts of water was poured into the gap 144. When the mortar appeared in the overflow tank 38 positioned 1 meter above the gap 144, and the bubbling terminated, the pouring of the mortar was terminated. Then the pressure in tanks 27 and 38 was increased gradually to the atmospheric pressure.

The filled gap was maintained at normal temperature for 28 days and the strength of the joint was measured to be 330 Kg/cm². By drilling a hole through the joint it was found that all interstices in the coarse aggregate were filled with the mortar.

EXAMPLE 13

This example relates to the embodiment shown in FIG. 42. The foundation 141 shown in FIG. 42 had a square cross-sectional configuration in which the length of one side was 1000 mm, and the height of the gap 144 was 100 mm. The time required to fill the same mortar as in Example 12 in the gap 144 was about 3 minutes, and the joint thus obtained was quite satisfactory.

EXAMPLE 14

This example relates to the embodiment shown in FIG. 43 except that the coarse aggregate was not prepacked. After reducing the pressure in gap 144 to 0.1 Kg/cm², a concrete mixture was poured therein through pipe 151 by means of a concrete pump. The time required for the pouring was about 5 minutes. An opening was drilled through the interface between the joint and the foundation 142 for inspecting the inside structure and it was found that the mortar was completely filled the gap.

EXAMPLE 15

This example relates to the embodiment shown in FIG. 44. Concrete moulded plate members 160 each having a thickness of 15 mm were applied to surround the gap 144 and putty was used as sealing members 159. Coarse aggregate consisting of No. 4 crushed stone described above was prepacked in the gap 144. After reducing the pressure in gap 144 to 0.2 Kg/cm², cement mortar similar to that used in Example 12 was poured into the gap 144 to form a joint. The interface between the joint and the upper pillar 142 was drilled for inspection. It was found that a dense structure similar to those of Examples 12 to 14 was formed.

EXAMPLE 16

This example relates to the embodiments shown in FIGS. 45 and 46. Rubber corner members 161 having a thickness of 15 mm and tie bars 162 having a diameter of 9 mm were used to assemble plates 164 into a mould. Thereafter the same process steps as in Example 15 were followed to obtain a joint. It was found that the joint was strongly bonded to the upper and lower structures 142 and 141.

We have also modified the embodiments shown in FIGS. 3, 12 - 14 and 29 - 33 such that the pouring side thereof was changed to that shown in FIGS. 4 to 11, that spreading means shown in FIGS. 15 to 19 were associated with the pouring tank 27, that the overflow tank 38 side shown in FIG. 3 was changed to that shown in FIGS. 25 to 28, and that the pipe leading to the overflow tank was changed to those shown in FIGS. 20 to 24. In each case, it was confirmed that so long as the pressure in the mould is reduced to a pressure less than 0.8 Kg/cm², the mechanical strength of the cast product could be improved greatly, and that maximum improvement could be obtained when the pressure is decreased below 0.7 Kg/cm². Accordingly, it is advantageous to use a vacuum higher than these values in all cases, the maximum vacuum being determined by the design and operating conditions of the apparatus. Further, it was found that the radious of the area that can be effectively poured with a single pouring tube varies depending upon such factors as the inside diameter of the pouring tube, the flow rate and composition of the mortar, the grain size and characteristic of the prepacked coarse aggregate. Where the inner diameter of the pouring tube is 25.4 mm and where No. 5 crushed stone is used as the coarse aggregate, the radius of the area in which satisfactory pouring is possible by a single pouring tube ranges from 2 to 3 meters. Generally speaking, a single pouring tube is sufficient for an area up to about 10 m².

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus for moulding a hydraulic substance comprising an injection tank, a moulding tank, and an overflow zone, said moulding tank being adapted to contain an aggregate, means for reducing the pressure in the moulding tank and in the overflow zone to a vacuum, means for introducing a cement and water mixture into the injection tank, means for transferring said mixture from the injection tank into the moulding tank in sufficient excess quantity to cause said mixture to overflow from the moulding tank into the overflow zone, and means for returning the overflow zone to at least atmospheric pressure, whereby at least a portion of said excess quantity of said mixture in the overflow zone is returned to the moulding tank to eliminate the voids between the aggregate in the moulding tank created by removing the excess water and entrained air under reduced pressure, and replacing said voids with said cement and water mixture to produce a substantially void-free product, said mixture being maintained in sufficient quantity in said overflow zone to avoid the introduction of air into the moulding tank.

2. The apparatus of claim 1, wherein the overflow zone is positioned above the moulding tank.

3. The apparatus of claim 2, wherein a perforated plate is disposed between the overflow zone and the moulding tank.

4. The apparatus of claim 1, wherein the overflow zone is a separate overflow tank which is positioned higher than the moulding tank.

5. The apparatus of claim 1, wherein the moulding tank and the overflow zone are disposed in a closed container and the means for reducing the pressure in the moulding tank and the overflow zone is a vacuum means which is operatively connected with the closed container.

6. The apparatus of claim 5, wherein the closed container is provided with a vent means which is closed by a valve means operatively associated therewith.

7. The apparatus of claim 4, wherein the overflow tank is provided with a vent means which is closed by a valve means operatively associated therewith.

8. The apparatus of claim 1, wherein a means is disposed at the point of introduction of the cement and water mixture to the moulding tank from the injection tank, said means functioning to increase the area at the inlet to the moulding tank to provide a smooth transition between the injection tank and the moulding tank and to reduce the tendency of the aggregate to block and reduce the effective area of transition between said tanks.

9. The apparatus of claim 8, wherein said means is a screen-like member.

10. The apparatus of claim 4, wherein the injection tank is disposed above the moulding tank.

11. The apparatus of claim 1, wherein the moulding tank is surrounded by an enclosure, and means are provided for evacuating the enclosure, said enclosure functioning as an intermediate chamber of reduced pressure formed between the atmosphere and the moulding tank, thereby protecting the environment in the moulding tank.

12. The apparatus of claim 4, wherein the injection tank is a closed tank and means are provided for evacuating said injection tank.

13. The apparatus of claim 1, wherein the injection tank is an open tank and a cushioning means is operatively disposed between the injection tank and the moulding tank.

14. The apparatus of claim 13, wherein the cushioning means is a closed tank and means are provided for evacuating said closed tank.

15. The apparatus of claim 14, wherein conduit means provide communication between the injection tank and the closed tank and between the closed tank and the moulding tank and valve means are provided in said conduit means between said tanks.

16. The apparatus of claim 13, wherein the cushioning means is an inverted U-shape tube which provides communication between the injection tank and the moulding tank, said inverted U-shape tube provided with a valve means.

17. The apparatus of claim 15, wherein a pump means is disposed in the conduit means between the injection tank and the closed tank.

18. The apparatus of claim 15, wherein a pump means is disposed in the conduit means between the closed tank and the moulding tank.

19. The apparatus of claim 13, wherein the cushioning means is a closed cylinder means and means are provided for evacuating said cylinder means.

20. The apparatus of claim 19, wherein conduit means provide communication between the injection tank and the closed cylinder and between the closed cylinder and the moulding tank and valve means are provided in said conduit means.

21. The apparatus of claim 20, wherein pump means are disposed in said conduit means between the injection tank and the closed cylinder.

22. The apparatus of claim 13, wherein the cushioning means is a bellows means and means are provided for evacuating said bellows means.

23. The apparatus of claim 22, wherein conduit means provide communication between the injection tank and the bellows means and between the bellow means and the moulding tank and valve means are provided in said conduit means.

24. An apparatus for moulding a hydraulic substance comprising a closed injection tank, a closed moulding tank and a closed overflow tank, said moulding tank being adapted to contain an aggregate, means for reducing the pressure in said tanks, conduit means connecting said pressure-reducing means to said tanks, an open supply tank operatively connected to the injection tank by conduit means, conduit means providing communication between said injection tank and said moulding tank, said conduit means containing a closed pump means which is also operatively connected with said pressure-reducing means, and a circulation conduit containing a pressure-regulating means, said circulation conduit being connected at one end to the injection tank and at the other end to the conduit between the moulding tank and the pump means, wherein a cement and water mixture is transferred from the open supply tank to the closed injection tank and, in turn, to the moulding tank in sufficient excess quantity to cause said mixture to overflow from the moulding tank into the overflow tank, and means are provided for returning the overflow tank to at least atmospheric pressure whereby at least a portion of said excess quantity of said mixture in the overflow tank is returned to the moulding tank to eliminate the voids between the aggregate in the moulding tank created by removing the excess water and entrained air under reduced pressure, and replacing said voids with said cement and water mixture to produce a substantially void-free product, said mixture being maintained in sufficient quantity in said overflow tank to avoid the introduction of air into the moulding tank.

25. The apparatus of claim 24, wherein the pressure-regulating means is a pressure-regulating tank.

26. The apparatus of claim 24, wherein the pressure-regulating means is a pressure-regulating valve.

27. The apparatus of claim 12, wherein a spreader means is disposed in the injection tank at a position beneath an opening for admitting said hydraulic substance, for removing excess water and entrained air from said hydraulic substance.

28. The apparatus of claim 27, wherein the spreader means is a triangular baffle plate.

29. The apparatus of claim 27, wherein the spreader means is provided with a vibrating means.

30. The apparatus of claim 12, wherein an open tank containing the hydraulic substance is connected to the injection tank and a throttle valve is positioned above the injection tank between said open tank and said injection tank for causing the hydraulic substance to drop into the reduced pressure atmosphere of the closed injection tank.

31. The apparatus of claim 12, wherein a vibrating means is mounted to the outside of the closed injection tank for vibrating the same to remove excess water and entrained air from the hydraulic substance.

32. The apparatus of claim 12, wherein the injection tank is an elongated, inclined, pipe-like element which is provided with an evacuating means and a vibrating means.

33. The apparatus of claim 1, wherein the overflow tank is connected to the moulding tank by a conduit means and said conduit means is filled with aggregate to a level higher than the moulding tank.

34. The apparatus of claim 33, wherein the conduit means contains a wire to prevent the coarse aggregate from filling the overflow tank.

35. The apparatus of claim 1, wherein the overflow tank is connected to the moulding tank by a conduit means and said conduit means and the lower portion of said overflow tank are filled with aggregate.

36. The apparatus of claim 35, wherein a wire is disposed above the aggregate to hold it in position.

37. An apparatus for moulding a hydraulic substance comprising an injection tank, a moulding tank, and an overflow chamber, said moulding tank being provided with double-walled end portions which divide the moulding tank into a central moulding tank and two lateral absorption chambers, said central moulding tank being adapted to contain an aggregate and said lateral absorption chambers being adapted to contain an absorption material, said lateral chambers communicating with the central moulding tank, means for reducing the pressure in the injection tank, the central moulding chamber, and the overflow chamber, means for evacuating the lateral absorption chambers, means for introducing a cement and water mixture into the injection tank, means for transferring said mixture from the injection tank into the central moulding tank in sufficient excess quantity to cause said mixture to overflow from the central moulding tank to the overflow chamber and means for returning said overflow chamber to at least atmospheric pressure whereby at least a portion of said excess quantity of said mixture in the overflow chamber is returned to the central moulding tank to eliminate the voids between the aggregate in the central moulding tank created by removing the excess water and entrained air under reduced pressure, and replacing said voids with said cement and water mixture to produce a substantially void-free product, said mixture being maintained in sufficient quantity in said overflow chamber to avoid the introduction of air into the central moulding tank.

38. The apparatus of claim 37, wherein the inner wall of said double-walled end portion contains an aperture which provides said communication between said lateral chambers and said central moulding tank.

39. The apparatus of claim 38, wherein said aperture contains a filter material.

40. The apparatus of claim 38, wherein said aperture contains a hydraulic substance detector.

41. The apparatus of claim 37, wherein said overflow chamber is an inverted U-shaped tube.

42. The apparatus of claim 37, wherein the overflow chamber is a transparent chamber.

43. The apparatus of claim 37, wherein said overflow chamber is a bellows-type device.

44. The apparatus of claim 37, wherein the overflow chamber is a coiled pipe.

45. The apparatus of claim 37, wherein the overflow chamber is a tank.

46. The apparatus of claim 12, wherein vacuum means are operatively associated with both the upper and lower portions of the moulding tank.

47. The apparatus of claim 12, wherein means are provided for introducing the cement and water mixture from the injection tank into the bottom of the moulding tank.

48. An apparatus for moulding a hydraulic substance comprising a closed injection tank, a mould adapted to contain an aggregate, and a closed overflow tank, said mould being disposed in a vacuum chamber, means for evacuating the injection tank, the vacuum chamber and the overflow tank, means for introducing a cement and water mixture into the injection tank, means for transferring said mixture from the injection tank into the mould disposed in the vacuum chamber in sufficient excess quantity to cause said mixture to overflow from the mould into the overflow tank and means for returning the overflow tank to at least atmospheric pressure whereby at least a portion of said excess quantity of said mixture in the overflow tank is returned to the mould disposed in said vacuum chamber to eliminate the voids between the aggregate in the mould created by removing the excess water and entrained air under reduced pressure, and replacing said voids with said cement and water mixture to produce a substantially void-free, moulded product, said mixture being maintained in sufficient quantity in said overflow tank to avoid the introduction of air into the mould.

49. The apparatus of claim 48, wherein the overflow tank is transparent so that the quantity of cement and water mixture which overflows the mould can be monitored.

50. An apparatus for repairing a crack in a concrete structure which comprises a cover plate on all sides of said crack to seal the crack from the atmosphere, an injection tank and an overflow tank in the vicinity of said crack, means for reducing the pressure in said crack and in the injection and overflow tanks, means for introducing a cement and water mixture into the injection tank, means for transferring said mixture from the injection tank into the crack in sufficient excess quantity to cause said mixture to overflow from the crack into the overflow tank, means for returning the overflow tank to at least atmospheric pressure whereby at least a portion of said excess quantity of said mixture in the overflow tank is returned to the crack to eliminate any voids which may have been produced in the mixture, by removing excess water and entrained air under reduced pressure, and replacing said voids with said cement and water mixture to produce a substantially void-free product, said mixture being maintained in sufficient quantity in said overflow tank to avoid the introduction of air into the crack.

51. An apparatus for interconnecting different portions of a concrete structure wherein a gap exists between said concrete structure and wherein said gap is adapted to be filled by a coarse aggregate, which comprises a porous cover around said aggregate disposed in said gap, means for applying a thin coating of concrete to said porous cover to seal said gap, an injection tank and an overflow tank disposed in the vicinity of said gap, means for reducing the pressure in said gap and in the injection and overflow tanks, means for introducing a cement and water mixture into the injection tank, means for transferring said mixture from the injection tank to the gap in sufficient excess quantity to cause said mixture to overflow from the gap into the overflow tank, means for returning the overflow tank to at least atmospheric pressure whereby at least a portion of said excess quantity of said mixture in the overflow tank is returned to the gap to eliminate the voids between the aggregate in the gap created by removing the excess water and entrained air under reduced pressure, and means for replacing said voids with said cement and water mixture to produce a substantially void-free product, said mixture being maintained in sufficient quantity in said overflow tank to avoid the introduction of air into the gap.

52. The apparatus of claim 51, wherein the porous cover is an expanded metal.

53. The apparatus of claim 50, wherein the cover plate is a flat plate which extends across all sides of the crack and is flush with the outer surface of the concrete structure, said plate being provided with an air sealing member and a mortar sealing member.

54. The apparatus of claim 53, wherein the flat plates are provided with wedge-shaped filling members, said filling members being drawn toward the crack when a vacuum is applied to said crack, thereby increasing the sealing effect of the crack.

55. The apparatus of claim 54, wherein corner plates are disposed at the corners of the concrete structure between the flat plates and said concrete structure and tie bars are provided to connect opposing flat plates together.

56. An apparatus for moulding a hydraulic substance comprising an aggregate and a cement and water mixture, said moulding apparatus comprising an injection tank, a moulding tank adapted to contain an aggregate and an overflow tank, means for reducing the pressure in the injection tank, in the moulding tank, and in the overflow tank to a vacuum, means for introducing the cement and water mixture into the injection tank, means for transferring said mixture from the injection tank into the moulding tank in sufficient excess quantity to cause said mixture to overflow from the moulding tank into the overflow tank, and means for returning the overflow tank to at least atmospheric pressure whereby at least a portion of said excess quantity of said mixture in the overflow tank is returned to the moulding tank to eliminate voids between the aggregate in the moulding tank created by removing the excess water and entrained air under reduced pressure, and replacing said voids with said cement and water mixture to produce a substantially voidfree product, said mixture being maintained in sufficient quantity in said overflow tank to avoid the introduction of air into the moulding tank.

57. The apparatus of claim 56, wherein the overflow tank is disposed at a lever above the moulding tank.

58. The apparatus of claim 57, wherein the overflow tank is transparent.

59. The apparatus of claim 56, wherein the moulding tank comprises an air impervious sheet disposed in a recess formed in the surface of the ground and a hood mounted to the periphery of said sheet above said recess.

* * * * *